(12) United States Patent
Kobel et al.

(10) Patent No.: US 12,019,857 B2
(45) Date of Patent: Jun. 25, 2024

(54) DIGITAL TWIN HYDRAULIC TROUBLESHOOTING

(71) Applicant: Oshkosh Corporation, Oshkosh, WI (US)

(72) Inventors: Korry D. Kobel, Oshkosh, WI (US); Doug Shoup, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 18/077,430

(22) Filed: Dec. 8, 2022

(65) Prior Publication Data

US 2023/0195293 A1 Jun. 22, 2023

Related U.S. Application Data

(60) Provisional application No. 63/292,785, filed on Dec. 22, 2021, provisional application No. 63/292,825, filed on Dec. 22, 2021.

(51) Int. Cl.
| | |
|---|---|
| *G06F 3/0482* | (2013.01) |
| *G01N 21/88* | (2006.01) |
| *G06F 3/04845* | (2022.01) |
| *G06K 7/14* | (2006.01) |
| *G06Q 30/0601* | (2023.01) |
| *G06T 19/00* | (2011.01) |

(52) U.S. Cl.
CPC ..... *G06F 3/04845* (2013.01); *G01N 21/8851* (2013.01); *G06F 3/0482* (2013.01); *G06K 7/1408* (2013.01); *G06Q 30/0633* (2013.01); *G06T 19/006* (2013.01)

(58) Field of Classification Search
CPC ............. G06F 3/04845; G06F 3/0482; G01N 21/8851; G06K 7/1408; G06Q 30/0633; G06T 19/006
See application file for complete search history.

(56) References Cited

U.S. PATENT DOCUMENTS

| | | | |
|---|---|---|---|
| 11,249,714 B2* | 2/2022 | Spivack | A63F 13/69 |
| 11,468,642 B2* | 10/2022 | Xie | G06T 11/00 |
| 2016/0274762 A1* | 9/2016 | Lopez | G06T 19/006 |
| 2016/0314623 A1* | 10/2016 | Coleman | G05B 19/409 |
| 2016/0328883 A1* | 11/2016 | Parfenov | G06T 17/00 |
| 2017/0103584 A1* | 4/2017 | Vats | G06T 19/20 |
| 2018/0322225 A1* | 11/2018 | Schwartz | G06T 19/00 |

(Continued)

OTHER PUBLICATIONS

Manlift ("Augmented Reality (AR)—How to Choose" https://www.youtube.com/watch?v=ulZyqf_9fgo Feb. 23, 2020) (Year: 2020).*

*Primary Examiner* — Beau D Spratt
(74) *Attorney, Agent, or Firm* — Foley & Lardner LLP

(57) ABSTRACT

A method for troubleshooting a piece of equipment includes providing an equipment troubleshooting graphical user interface (GUI) to a user device. The method also includes receiving, from the user device, an input indicating an identity of a piece of equipment and providing, via the GUI, a 3D model of the identified piece of equipment. The 3D model includes a plurality of components. The method also includes receiving, from the user device, a selection of a function and updating the GUI to emphasize components of the 3D model corresponding to the selected function.

18 Claims, 28 Drawing Sheets

(56) References Cited

U.S. PATENT DOCUMENTS

| | | |
|---|---|---|
| 2019/0251750 A1* | 8/2019 | Brewer .................. G06F 3/0304 |
| 2020/0095105 A1 | 3/2020 | Yutzy et al. |
| 2021/0060366 A1 | 3/2021 | Minnick et al. |
| 2021/0279914 A1* | 9/2021 | Shoup .................... G06Q 10/20 |
| 2021/0358294 A1* | 11/2021 | Parashar ................ G08C 17/02 |
| 2022/0194769 A1 | 6/2022 | Kobel et al. |
| 2022/0198905 A1 | 6/2022 | Brulo et al. |
| 2022/0227612 A1 | 7/2022 | Kobel et al. |
| 2022/0227613 A1 | 7/2022 | Boroni et al. |
| 2022/0227614 A1 | 7/2022 | Yutzy et al. |
| 2022/0229415 A1 | 7/2022 | Kobel et al. |
| 2022/0229431 A1 | 7/2022 | Kobel et al. |
| 2022/0229523 A1 | 7/2022 | Kobel et al. |
| 2022/0229872 A1 | 7/2022 | Kobel et al. |
| 2022/0230224 A1 | 7/2022 | Kobel et al. |
| 2022/0230488 A1 | 7/2022 | Kobel et al. |
| 2022/0230523 A1 | 7/2022 | Kobel et al. |
| 2022/0232352 A1 | 7/2022 | Kobel et al. |
| 2022/0232649 A1 | 7/2022 | Kobel et al. |
| 2022/0332556 A1 | 10/2022 | Kobel et al. |
| 2023/0046835 A1 | 2/2023 | Kobel et al. |

* cited by examiner

DIGITAL TWIN HYDRAULIC TROUBLESHOOTING

CROSS-REFERENCE TO RELATED PATENT APPLICATIONS

This application claims the benefit of and priority to U.S. Provisional Application No. 63/292,785, filed on Dec. 22, 2021 and U.S. Provisional Application No. 63/292,825, filed on Dec. 22, 2021, both of which are hereby incorporated by reference in their entireties herein.

BACKGROUND

Conventional methods of maintaining and repairing building equipment rely on two-dimensional maintenance manuals. Identifying components can be difficult due to the quantity of components included in a relatively small area. There exists a need to provide a method for improving maintenance and repair of building equipment. Similarly, conventional methods of building equipment modeling rely on virtual modeling and/or modeling based on physical operational parameters. There exists a need to provide a method for improving building equipment modeling with augmented reality applications.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One embodiment of the present disclosure relates to a method for troubleshooting a piece of equipment. The method includes providing an equipment troubleshooting graphical user interface (GUI) to a user device. The method also includes receiving, from the user device, an input indicating an identity of a piece of equipment and providing, via the GUI, a 3D model of the identified piece of equipment. The 3D model includes a plurality of components. The method also includes receiving, from the user device, a selection of a function and updating the GUI to emphasize components of the 3D model corresponding to the selected function.

Another embodiment of the present disclosure relates to a system for troubleshooting a piece of equipment. The system includes a user device configured to display a GUI and a server comprising a processing circuit comprising one or more processors and memory storing instructions. When executed by the one or more processors, the instructions cause the one or more processors to perform operations. The operations include providing an equipment troubleshooting GUI to the user device. The operations also include receiving, from the user device, an input indicating an identity of a piece of equipment and providing, via the GUI, a 3D model of the identified piece of equipment. The 3D model includes a plurality of components. The operations also include receiving, from the user device, a selection of a function and updating the GUI to emphasize components of the 3D model corresponding to the selected function.

Still another embodiment of the present disclosure includes an equipment troubleshooting tool for providing three-dimensional models of selected equipment. The tool includes a non-transitory computer-readable medium having instructions stored thereon that, when executed by one or more processors, cause the one or more processors to implement operations. The operations include providing a GUI to the user device. The operations also include receiving, from the user device, an input indicating an identity of a piece of equipment and providing, via the GUI, a model of the identified piece of equipment. The model includes a plurality of components. The operations also include receiving, from the user device, a selection of a function and updating the GUI to emphasize components of the model associated with the selected function.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description, illustrated in the figures. It should also be understood that the terminology is for the purpose of description only and should not be regarded as limiting.

Overview

Construction equipment, including scissor lifts, boom lifts and telehandlers include numerous electrical, hydraulic, and mechanical components. For example, a scissor lift may include electrical components including batteries, wires, and motors, hydraulic components such as pumps, hoses, and actuators, and mechanical components, including wheels, linkages, and a work platform. To minimize the footprint and overall size of this equipment, these components are relatively tightly packed together. Because of this, it can be difficult to identify the function of each component using two dimensional schematics and even conventional three dimensional schematics, which can make maintaining and repairing the equipment more difficult. For example, it may be difficult to tell a hydraulic hose configured to lift the work platform of a scissor lift from a hydraulic hose configured to drive the scissor lift forward.

Accordingly, it would be advantageous to provide an application that optimizes a user's ability to identify components of construction equipment (e.g., boom lift, scissor lift, etc.) in order to maintain or repair the equipment. In some embodiments, this may be performed via an application (e.g., workstation application, phone application, website application, etc.) that provides a user with a three dimensional model (e.g. 3D model, CAD model, digital twin etc.) of the equipment and highlights components based on their functions to maintain, troubleshoot, and repair the equipment.

Augmented Reality Application

Figure 1:
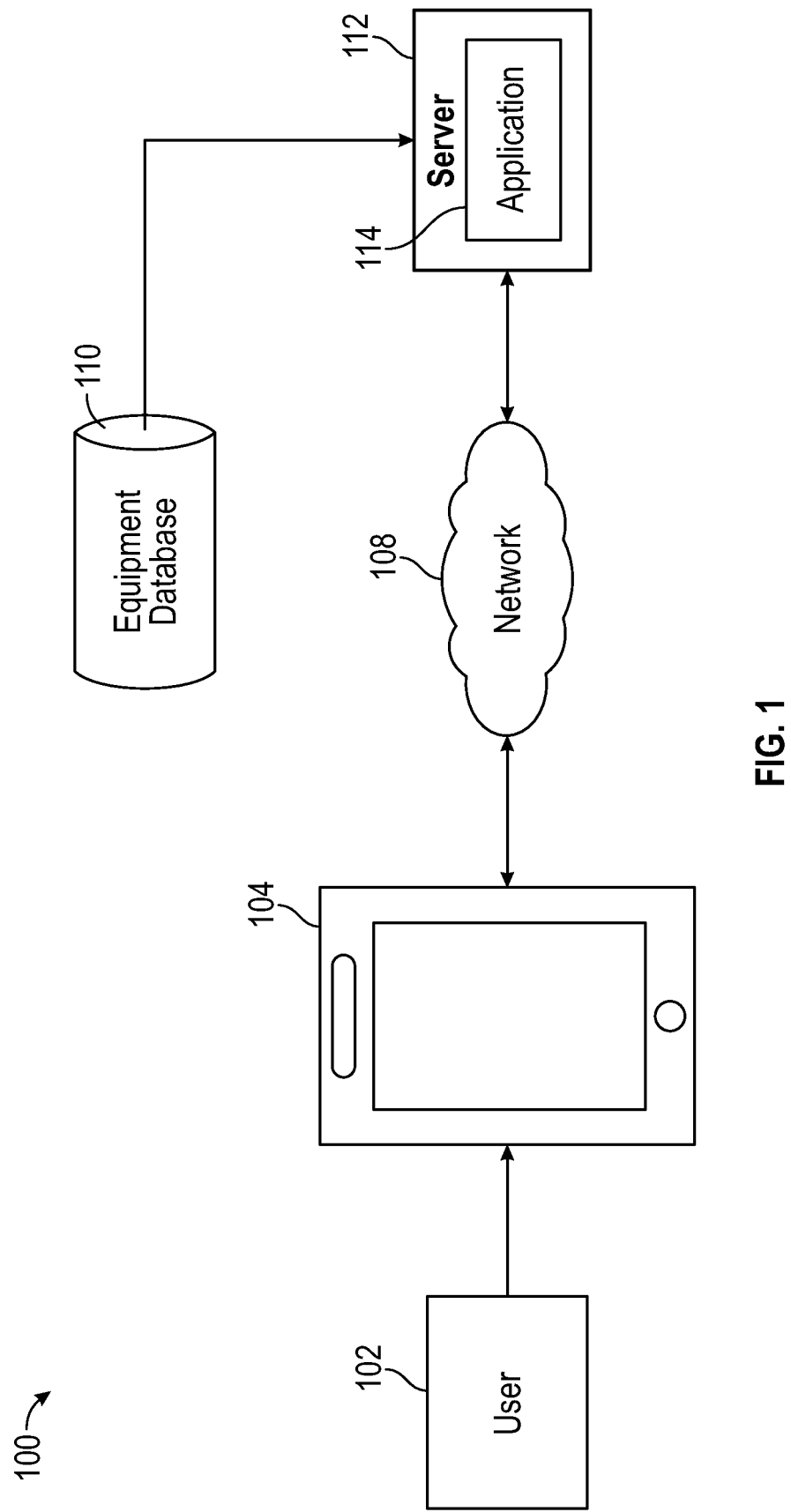
FIG. 1 is a block diagram of a system for implementing an equipment troubleshooting application, according to some embodiments.

Referring now to FIG. 1, a system 100 for implementing a troubleshooting application for equipment is shown, according to an example embodiment. System 100 may be a system to aid in maintaining, troubleshooting, and repairing equipment (e.g., lifts, boom lifts, scissor lifts, etc.) to facilitate predictable and reliable operation of the equipment at the worksite. System 100 is shown to include user 102, user device 104, network 108, equipment database 110, server 112, and application 114.

User 102 may include any individual capable of engaging with the application 114 via one or more user devices 104. In an exemplary embodiment, user 102 is a technician responsible for maintaining, troubleshooting, or repairing the equipment. In other embodiments, user 102 includes equipment operators, foreman, customers, and other individuals that may be associated with the project for which the equipment is needed.

User device 104 may be configured to display the application 114. In some embodiments, user device 104 is a smartphone, tablet, or other portable processing device. User device 104 may include a display screen configured to display a graphical user interface (GUI) generated by the application 114. In other embodiments, user device 104 is a workstation capable of providing the application to a monitor for display/interaction. User device 104 may include several devices that allow more than one user to engage with the application. In such an embodiment, user device 104 may refer to multiple smartphones or multiple tablets for technicians at a worksite.

Network 108 may include one or more routers configured to route data from server 112 to user device 104. In some embodiments, network 108 spans several buildings or regions such that server 112 is located off-premise from user device 104. For example, server 112 may be located at a datacenter and user device 104 is located in a building several hundred miles away. Network 108 may connect these two locations via a collection of interconnected networks (e.g., the Internet, a cloud, etc.).

Equipment database 110 may be a database configured to store information relating to construction equipment. In some embodiments, various equipment determined or selected to be included in the application 114 may have a set of information (e.g., technical manuals, technical specifications, CAD models, engineering drawings, etc.) that provide the operational details of the equipment. Equipment database 110 may be configured to store this information and provide the information to the application 114 upon request. Equipment database 110 may be located locally (e.g., in the same building or region as the equipment) or off-premise. In other embodiments, equipment database 110 is located within server 112 and application 114 does not need to query an external database for equipment information. In some embodiments, the equipment database 110 may be stored locally on the user device 104.

Server 112 may be any platform configured to store, process, and secure data. In some embodiments, server 112 is a database server configured to store and process application 114. Application 114 may be provided as software-as-a-service (SaaS). The software for application 114 may be licensed to user 102 to use on user device 104, but application 114 may remain hosted (e.g., stored, etc.) on server 112. In other embodiments, application 114 is stored and processed on user device 104. In an exemplary embodiment, server 112 is shown to query equipment information from equipment database 110. While system 100 shows application 114 being hosted off-premise, the hosting and processing may be performed on user device 104 or a local server. In some embodiments the application 114 and the equipment database 110 may both be stored locally on the user device 104. In these embodiments, the application may be able to operate on the user device 104 without the need for the network 106 or server 112. Together, the user device 104, server 112, application 114, and equipment database 110 may function as an equipment troubleshooting tool to aid the user 102 in maintaining, troubleshooting and repairing equipment.

Figure 2:
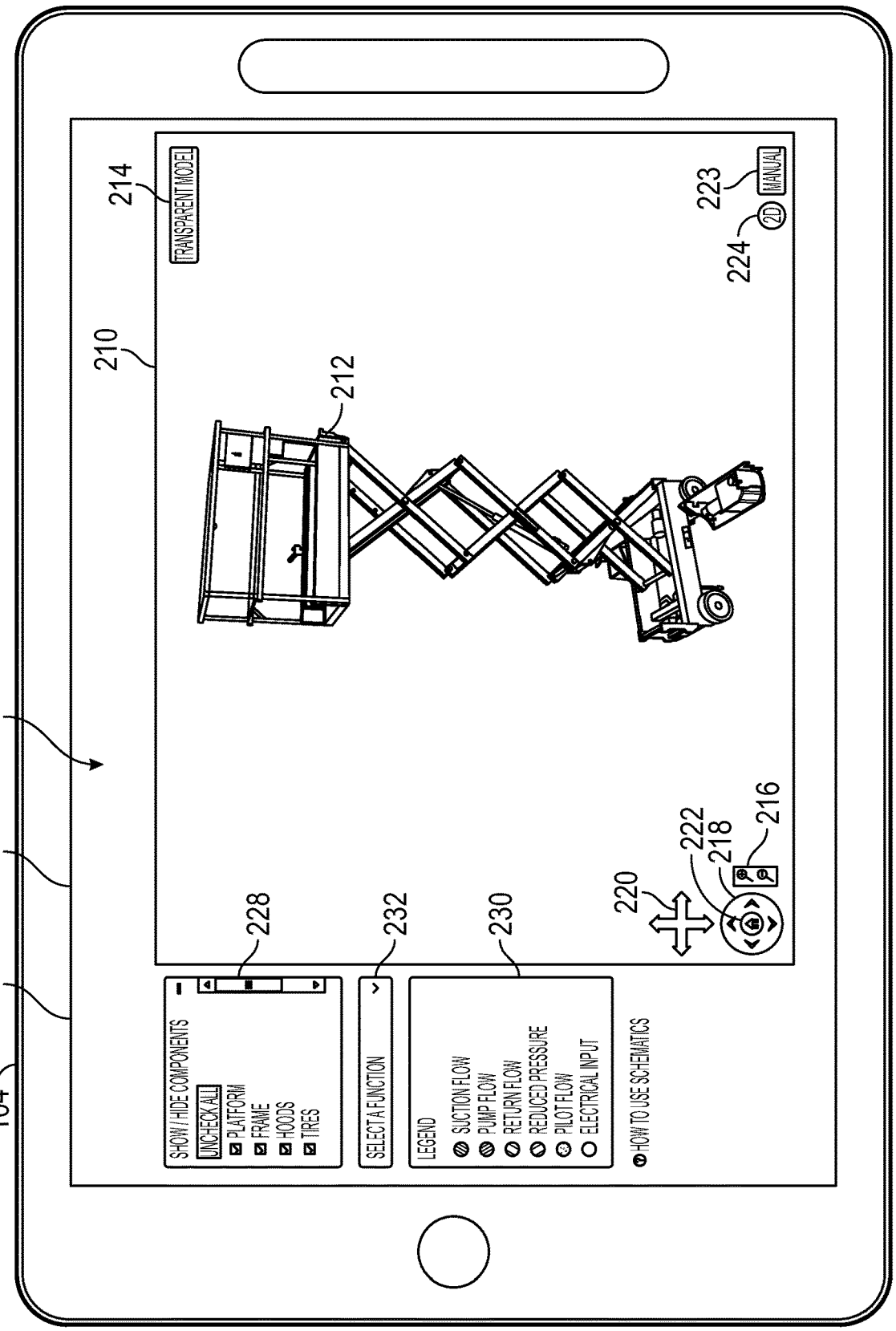
FIG. 2 shows a user device displaying a graphical user interface during operation of the application of FIG. 1, according to some embodiments.
Figure 10:
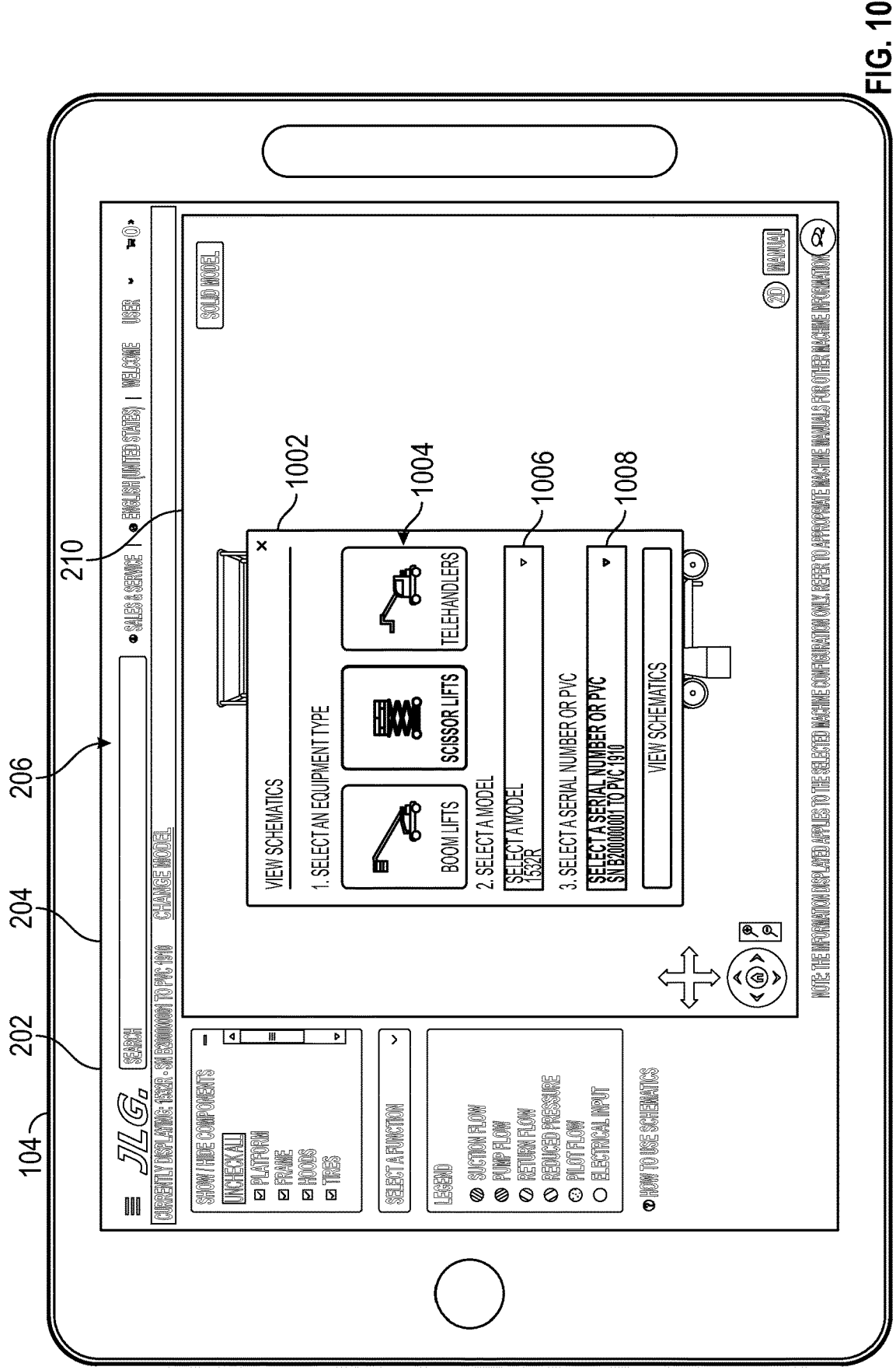
FIG. 10 shows a user device displaying a graphical user interface during operation of the application of FIG. 1, according to some embodiments.

Referring now to FIG. 2, a user device 104 is shown during operation of the application 114. In this embodiment, user device 104 is a tablet computer. The user device includes a display screen 202 configured to display an equipment troubleshooting GUI 206 generated by the application 114. The display screen may include a touchscreen 204, the touchscreen 204 may be configured to receive inputs from a user. A user may provide inputs to the touchscreen 204 by touching the touchscreen 204 with one or more fingers to interact with the GUI 206. In other embodiments, the user 102 may interact with the GUI via a mouse, keyboard, or other computer interface device. The GUI 206 may include a 3D navigation window 210 configured to show a 3D model 212 (e.g. CAD model, digital twin, etc.) of a piece of building equipment. The user 102 may first identify a particular piece of equipment from the equipment database 110 that the user 102 wishes to troubleshoot. The application 114 may display the 3D model 212 of the identified equipment. An example of an equipment selection window 1002 is shown in FIG. 10. In the example shown in FIG. 2, the building equipment shown in 3D model 212 is a scissor lift. The 3D model 212 may include various electrical, hydraulic, and mechanical components that make up the equipment.

The 3D navigation window 210 may include a number of controls allowing the user 102 to submit manipulation commands to the application to manipulate the appearance, position, and orientation of the 3D model 212 within the window 210. It should be understood that any of these controls may be located outside the 3D navigation window (e.g. to the left or right of the 3D navigation window 210, etc.). The 3D navigation window 210 may include a transparency toggle 214. Selecting the transparency toggle 214 (e.g. by touching the touchscreen where the transparency toggle 214 is being displayed, by clicking the transparency toggle with a mouse, etc.) may cause one or more components of the 3D model 212 to become at least partially transparent. This may improve visibility of certain internal components that may be blocked by other components. For example, selecting the transparency toggle 214 may cause the mechanical components of the scissor lift (e.g. the wheels, base, linkages, platform, etc.) to become partially transparent such that the hydraulic and electrical components can be seen through the mechanical components. Selecting the transparency toggle 214 when components are hidden may return the components to a non-transparent state.

The 3D navigation window 210 may include a zoom control 216. The zoom control 216 may include a zoom-in button and a zoom-out button. Selecting the zoom-in button may send a zoom command causing the application to adjust the GUI to zoom in on the 3D model 212 within the 3D navigation window 210. This may cause the 3D model to appear larger in the 3D navigation window 210. Selecting the zoom-out button may cause the application to adjust the GUI 206 to zoom out from the 3D model 212 within the 3D navigation window 210. This may cause the 3D model to appear smaller in the 3D navigation window. The user 102 may perform the functions of zoom control 216 in ways other than selecting the button in zoom control 216. For example, the user 102, on a tablet computer with a touchscreen 204 may zoom in to the 3D model by touching the tablet with two fingers and dragging the fingers closer together across the touchscreen 204 (e.g. pinch-to-zoom). On a laptop computer, a user may zoom in by rolling a scroll wheel of a mouse toward the user, or by moving two fingers forward on a touchpad. The user 102 may zoom out by performing the opposite actions.

The 3D navigation window 210 may include a rotation control 218. The rotation control 218 may include an up, down, left, and right directional controls. Selecting the left or right directional controls may send a rotation command causing the application 114 to adjust the GUI 206 to rotate the 3D model 212 about a vertical axis of the 3D navigation window 210. Selecting the up or down directional controls may cause the application to adjust the GUI 206 to rotate the 3D model 212 about a horizontal axis of the 3D navigation window. The user 102 may perform the functions of rotation control 218 in ways other than selecting the directional controls. For example, the user 102, on a tablet computer with a touchscreen 204 may rotate the 3D model by touching the touchscreen 204 with one finger and dragging the finger across the touchscreen 204. On a computer, a user may rotate the 3D model 212 by clicking within the 3D navigation window 210 and dragging the mouse while holding down the click button. On a laptop computer the user 102 may rotate the 3D model by clicking within the 3D navigation widow 210 and dragging a finger across a touchpad while holding the click button down.

The 3D navigation window 210 may include a pan control 220. The pan control 220 may include an up, down, left, and right directional controls. Selecting the left or right directional controls may send a pan command causing the application to adjust the GUI 206 to move the 3D model 212 left or right within the 3D navigation window 210. Selecting the up or down directional controls may cause the application to adjust the GUI 206 to move the 3D model 212 up or down within the 3D navigation window. For example, selecting the left directional control may cause the 3D model 212 to appear farther to the left within the 3D navigation window 210 than before the left directional control was selected. The user 102 may perform the functions of pan control 220 in ways other than selecting the directional controls. For example, the user 102, on a tablet computer with a touchscreen 204 may pan the 3D model 212 by touching the touchscreen 204 with two finger and dragging the fingers across the touchscreen 204. On a computer, a user may pan the 3D model 212 by holding down a CTRL button and clicking within the 3D navigation window 210, and then dragging the mouse while holding down the click button. On a laptop computer the user 102 may pan the 3D model by holding down a CTRL button and clicking within the 3D navigation window 210, then dragging a finger across a touchpad while holding the click button down.

The 3D navigation window 210 may include a home button 222. Selection of the home button 222 may cause the application to update the GUI 206 to return the 3D model 212 to a neutral starting position and orientation. As used herein, updating or replacing a GUI refers to changing the appearance and/or interactive features of the GUI as it appears on the display screen 202 of the user device 104. For example, selection of the home button 222 may cause the 3D model to return to the center of the 3D navigation window 210, in an upright orientation, and sized such that the entire 3D model 212 is visible within the 3D navigation window 210, as shown in FIG. 2. The user 102 may perform the functions of the home button 222 in ways other than selecting the home button 222. For example, the user 102, on a tablet computer with a touchscreen 204 may return the 3D model 212 to a neutral starting positon within the 3D navigation window by double-tapping the touchscreen 204 with a finger. On a laptop computer, the user may double click a click button on a mouse or touchpad to return the 3D model 212 to a neutral starting positon.

The 3D navigation window 210 may also include a maintenance manual button 223. Selection of the maintenance manual button 223 may cause the application 114 to update the GUI 206 to replace all or a portion of the GUI with a text-based maintenance manual (e.g., a portable document format (PDF) file, etc.) for the building equipment corresponding to the 3D model. In some embodiments, a new GUI (e.g. a new window, a new tab, etc.) may be generated, while the GUI 206 is preserved. The user may be able to toggle between the new GUI and GUI 206 or both GUIs may be displayed on the display screen 202 simultaneously. This allows the user 102 to view the maintenance instructions for the equipment corresponding to the 3D model 212 while viewing a specific portion of the 3D model 212 in the navigation window 210 of GUI 206.

The 3D navigation window 210 may include a 2D schematic button 224. Selection of the 2D schematic button 224 may cause the application 114 to update the GUI 206 to replace all or a portion of the GUI with a 2D schematic view of the building equipment corresponding to the 3D model 212. For example, the 2D schematic may include a hydraulic schematic or an electrical schematic. In some embodiments, a new GUI (e.g. a new window, a new tab, etc.) may be generated, while the GUI 206 is preserved. The user may be able to toggle between the new GUI and GUI 206 or both GUIs may be displayed on the display screen 202 simultaneously. This allows the user 102 to view the 2D schematic for the equipment corresponding to the 3D model 212 while viewing a specific portion of the 3D model 212 in the navigation window 210 of GUI 206.

The GUI may also include a legend 230 which may identify components of the 3D model 212 via color coding or other visual identifiers (e.g. hatching, patterns, etc.). The name or type of component may be shown next to a color swatch identifying the color of the component in the 3D navigation window 210. For example the legend may indicate that suction flow hydraulic components of the 3D model 212 are shown in the 3D navigation window in green, while the pump flow hydraulic components are shown in red. This may aid the user 102 in identifying the components of the building equipment corresponding to the 3D model 212.

The GUI 206 may also include a show/hide toggle window 228. The show/hide toggle window 228 may list one or more components of the 3D model 212, each with a corresponding toggle button (e.g. radio button, check box, etc.). Selection of the toggle button may send a command causing the corresponding component to be hidden from the 3D navigation window. This may improve visibility of internal components of the 3D model. For example, the user may select the toggle button corresponding to the frame of a scissor lift. This may cause the frame to become invisible such that the components underneath the frame can be seen more easily. Selection of the toggle button for the second time may cause the component to return to the visible state from the hidden state.

The GUI 206 may also include a how-to-use button 231. The how-to-use button 231 may cause the application 114 to update the GUI 206 to include instructions for interacting with the GUI 206. For example, the GUI 206 may be updated to explain the various features of the application 114 and/or explain how the 3D model can be manipulated with various devices (e.g., touchscreen, mouse, touchpad, etc.).

Figure 3:
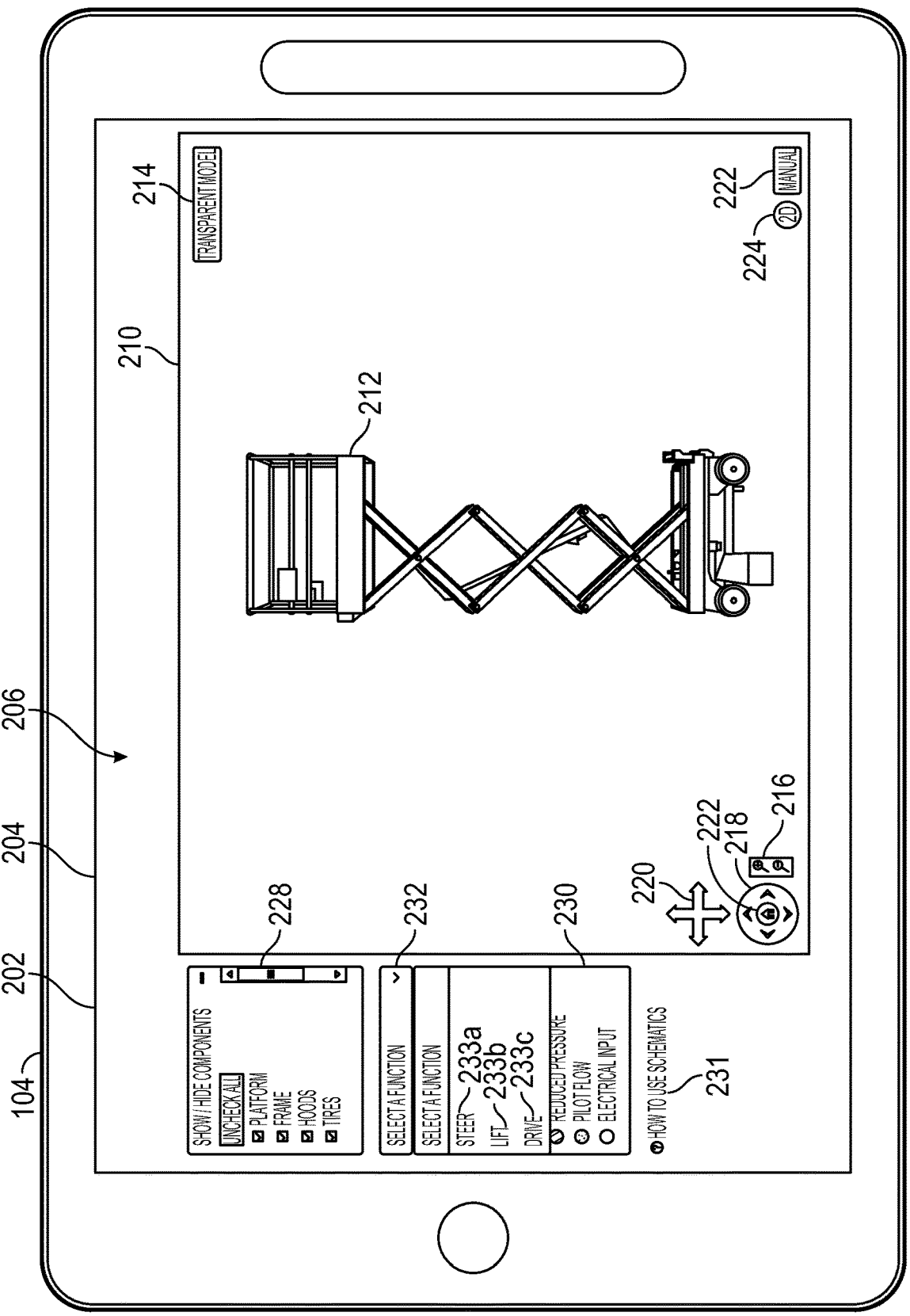
FIG. 3 shows a user device displaying a graphical user interface during operation of the application of FIG. 1, according to some embodiments.

The GUI 206 may also include a function selection menu 232. Selection of the function selection menu 232 may cause the application to update the GUI 206 to display a list of functions that may be performed by the building equipment corresponding to the 3D model. For example, the functions of a scissor lift may include lifting the work platform, driving the lift, and steering the lift. FIG. 3 illustrates a user device displaying the GUI 206 after the function selection menu 232 has been selected. In some embodiments, the function selection menu 232 is a drop-down window. In some embodiments the list of functions may be visible without an initial selection of the function selection menu 232. In the example shown in FIG. 3, the function selection menu 232 is a drop-down menu with three function options 233 corresponding to functions of the corresponding building equipment, for example, a steer option 233*a*, a lift option 233*b*, and a drive option. Selection of one of the function options 233 may cause the application the update the GUI with an additional selection window, directional selector 234, shown in FIG. 4.

Figure 4:
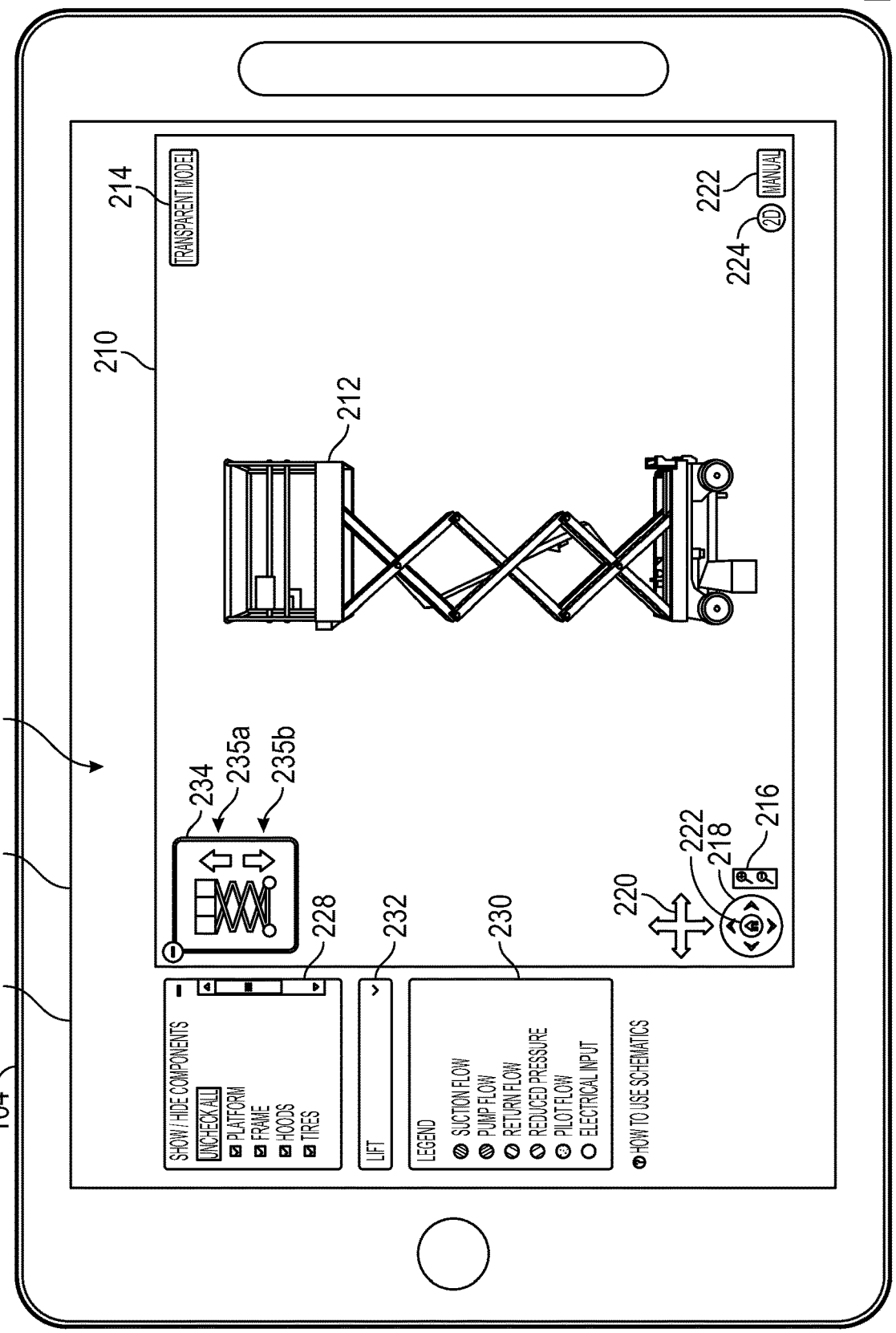
FIG. 4 shows a user device displaying a graphical user interface during operation of the application of FIG. 1, according to some embodiments.

In the example shown in FIG. 4, the lift option 233*b* has been selected. The directional selector 234 may contain one or more sub-selections 235. The sub-selections 235 may correspond to directions of movement. In the example shown in FIG. 4, sub-selection 235*a* corresponds to moving the work platform of the scissor lift upward, while sub-selection 235*b* corresponds to moving the work platform downward. In other examples, the sub-selections 235 may correspond to driving forward and backward, turning left or right, extending or retracting a boom on a boom lift, turning on or turning off lights, or any other function that may be performed by the equipment.

Figure 5:
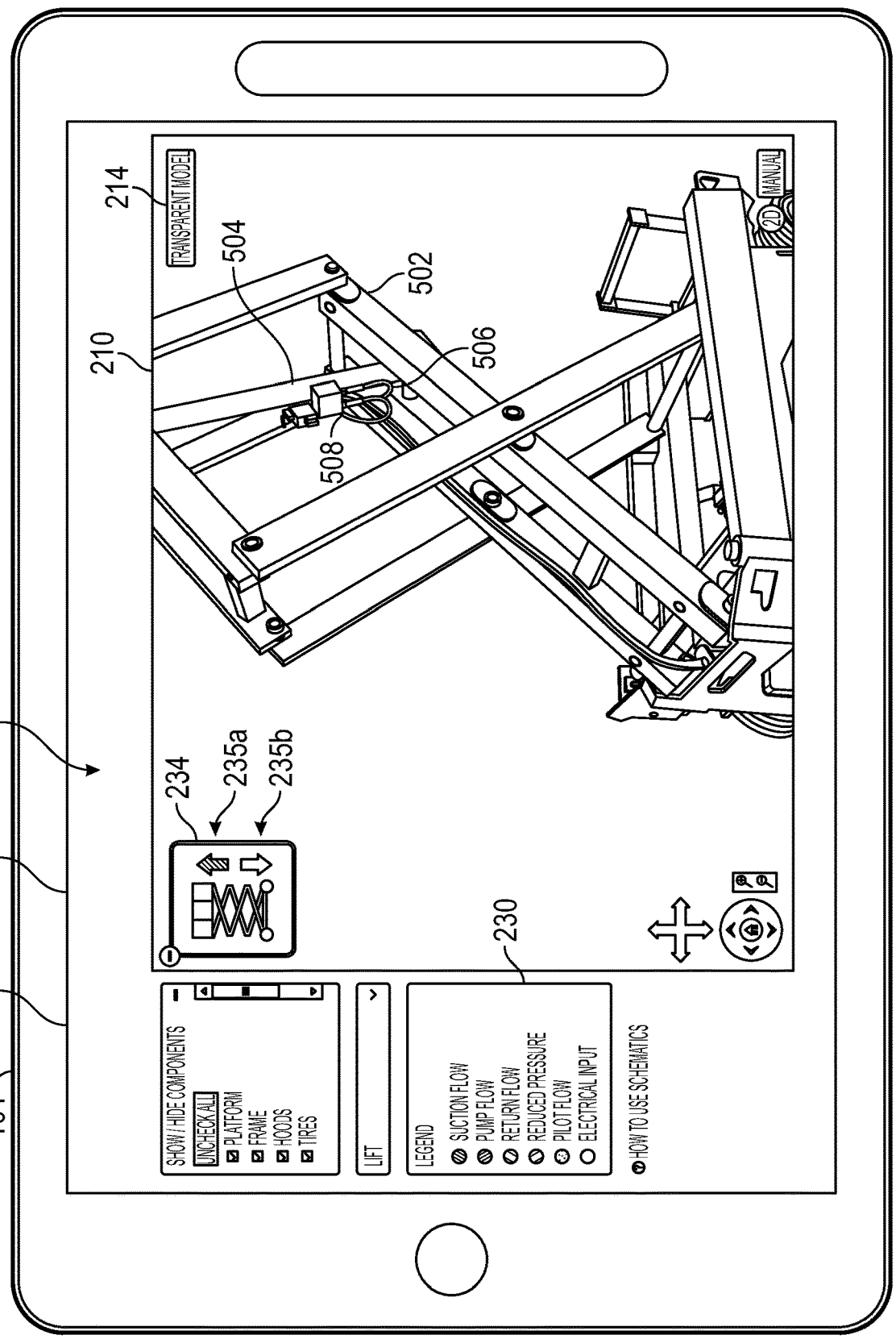
FIG. 5 shows a user device displaying a graphical user interface during operation of the application of FIG. 1, according to some embodiments.

Referring now to FIG. 5, the user device 104 is shown during operation of the application 114 after sub-selection 235*a* has been selected. The position and orientation of the 3D model 212 within the 3D navigation window 210 has been manipulated to focus on the linkages 502 and the hydraulic actuator 504 of the scissor lift 3D model 212. The sub-selection 235 may change in appearance to indicate that it has been selected. Selection of the sub-selection 235 may cause the application to update the GUI to show, highlight, or emphasize components of the 3D model 212 corresponding to the selected equipment function. In the example shown in FIG. 5 sub-selection 235*a* corresponds to lifting the work platform of the scissor lift. In this example, selection of sub-selection 235*a* causes the hydraulic hoses 506, 508 of the scissor lift 3D model 212 to appear. In other examples, the hydraulic hoses 506, 508 may previously have been visible, and selection of sub-selection 235*a* causes the hoses to be emphasized (e.g., by changing color, by becoming brighter, by changing from semi-transparent to fully visible, etc.). In some embodiments, selection of the sub-selection 235 may cause components that are hidden by other components or otherwise not visible to become visible. For example, a hydraulic hose within a compartment of the equipment may appear in front of the walls of the compartment. The user may then select components of the equipment (e.g., the walls of the compartment) to hide such that the hydraulic hose can be shown in context with the other components inside the compartment. The emphasized components corresponding to the chosen sub-selection 235 may be shown in colors corresponding to the legend 230. For example, the legend 230 may indicate that pump flow components are shown in red, while return flow components are shown in blue. Hydraulic hose 506 may be a pump flow hose and may therefore appear in red, while hydraulic hose 508 may be a return flow hose and may then appear in blue. The hydraulic hoses 506, 508 can be seen extending from the frame of the scissor lift to the hydraulic actuator 504.

Figure 6:
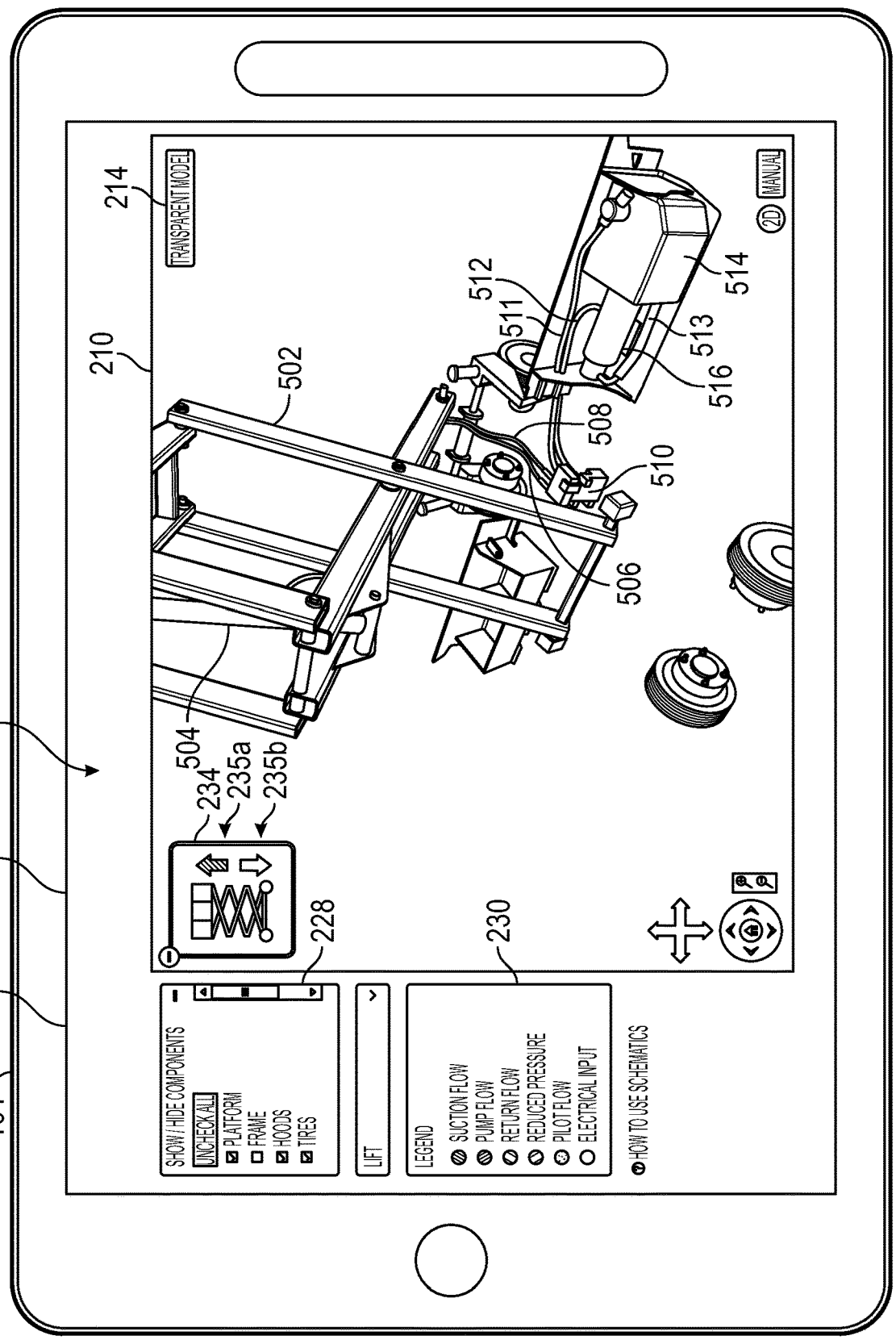
FIG. 6 shows a user device displaying a graphical user interface during operation of the application of FIG. 1, according to some embodiments.

Referring now to FIG. 6, the user device 104 is shown during operation of the application 114 after sub-selection 235a has been selected, with the 3D model 212 in an alternate orientation. A check box in the show/hide toggle window 228 corresponding to the frame of the scissor lift has been deselected, causing the application 114 to update the GUI 206 to hide the frame in the 3D model 212. This allows for greater visibility of the hydraulic components. Hydraulic hoses 506, 508 can be seen connecting to the main control valve 510 and additional hoses 511, 512, 513 can be seen connecting variously to the hydraulic tank 514 and the hydraulic pump 516. The user 102 may use the 3D model with the emphasized components to more easily identify the hoses 506, 508, 512 on the corresponding equipment and see how they connect to the other hydraulic components 504, 514, 516. It should be understood that the application 114 is not limited to emphasizing hydraulic components. For example, the function selection menu 232 may have functions that may be performed by electrical components. Selection of a sub-selection 235 may cause electrical components, such as wires, batteries, or motors, to be emphasized.

As an example of the foregoing, a user 102 troubleshooting a piece of equipment (e.g. a scissor lift) may load the application 114 onto a user device 104 such as a tablet and select the 3D model corresponding to the model number of the scissor lift. The application 114 may generate a GUI 206 which may be displayed on the display screen 202 of the user device 104. If the scissor lift is malfunctioning such that the work platform will not rise, the user 102 may select the "Lift" option from the function selection menu 232 and select the sub-selection 235a corresponding to raising the work platform (e.g. an up arrow, etc.). Selection of the sub-selection 235a causes the 3D model 212 to display the hydraulic hoses 506, 508 relating to lifting the work platform. The user 102 may then identify the hydraulic hoses on the real-world scissor lift based on the 3D model 212. The user may then inspect the hoses for damage and replace a damaged hose if necessary. If no hoses are damaged, the user may then inspect the other hydraulic components in the system such as the hydraulic actuator responsible for lifting the work platform. The use of the application reduces the likelihood that the wrong hoses or components are identified or the correct components are overlooked. This makes maintaining, troubleshooting, and repairing the equipment easier, faster, and safer.

Figure 7:
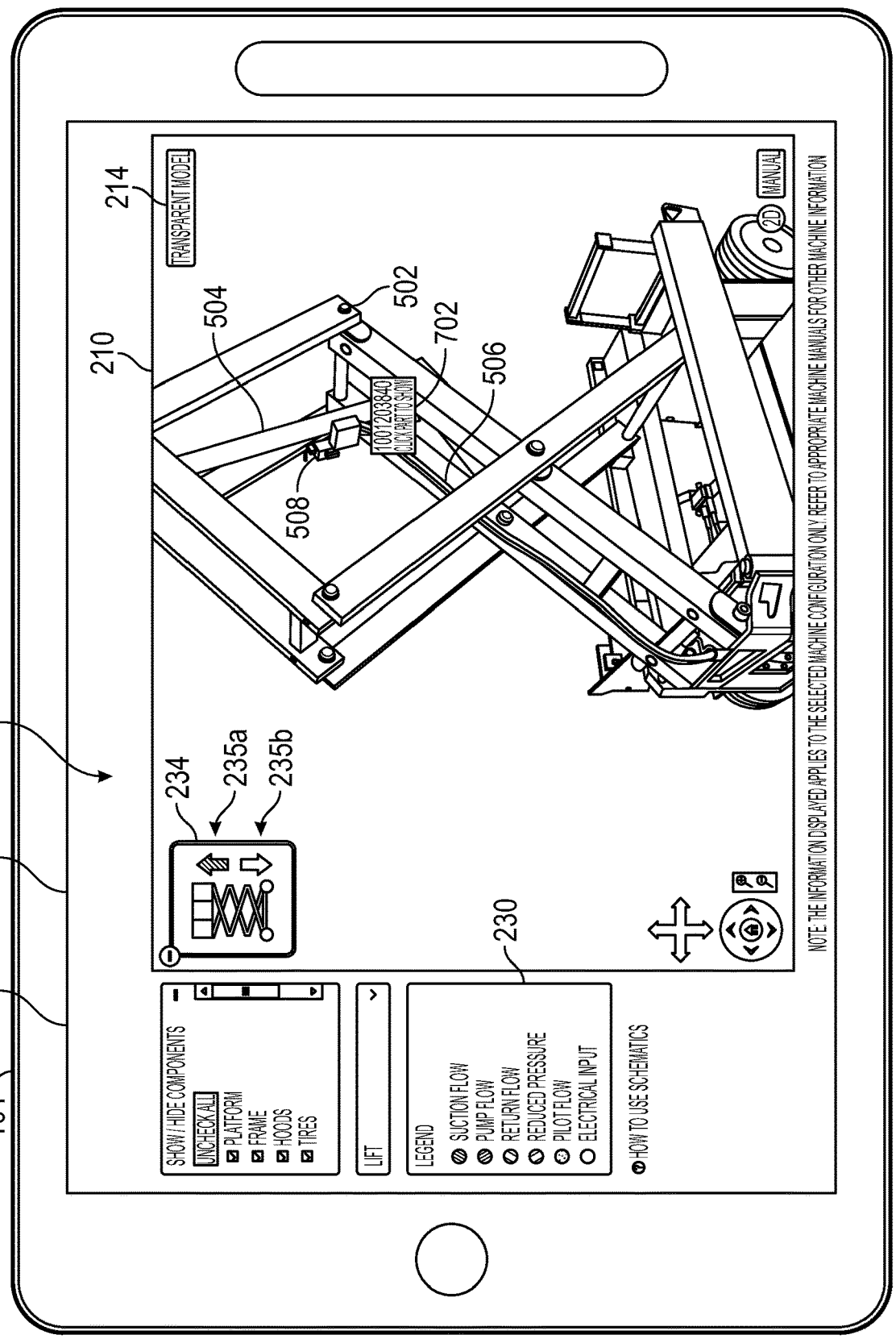
FIG. 7 shows a user device displaying a graphical user interface during operation of the application of FIG. 1, according to some embodiments.

Referring now to FIG. 7, the user device 104 is shown during operation of the application 114 after sub-selection 235a has been selected, with the 3D model 212 in an alternate orientation. Another function of application 114 includes displaying additional information about the components. For example, hovering over a component of the 3D model with a mouse cursor (or touching the part on a touchscreen etc.) may cause the application 114 to update the GUI 206 to display an info window 702 including the part number, the part name, and other information about the component (e.g. length, diameter, pressure rating, etc.). In some embodiments, the info window 702 includes a link that a user 102 may select to add the component to a digital shopping cart. A user 102 may use the application 114 as described above to identify a component that is damaged or worn and may simply select the component on the corresponding 3D model 212 to add it to the digital shopping cart for purchase. Alternatively the user 102 may record the part number of the component and purchase a replacement component via a traditional internet shopping website or via phone. In some embodiments, hovering over the component in the 3D model with a mouse cursor may cause the info window 702 to appear and display the part number. Clicking the component in the 3D model 212 with the mouse may then cause the info window 702 to display the link to add the component to the digital shopping cart.

Figure 8:
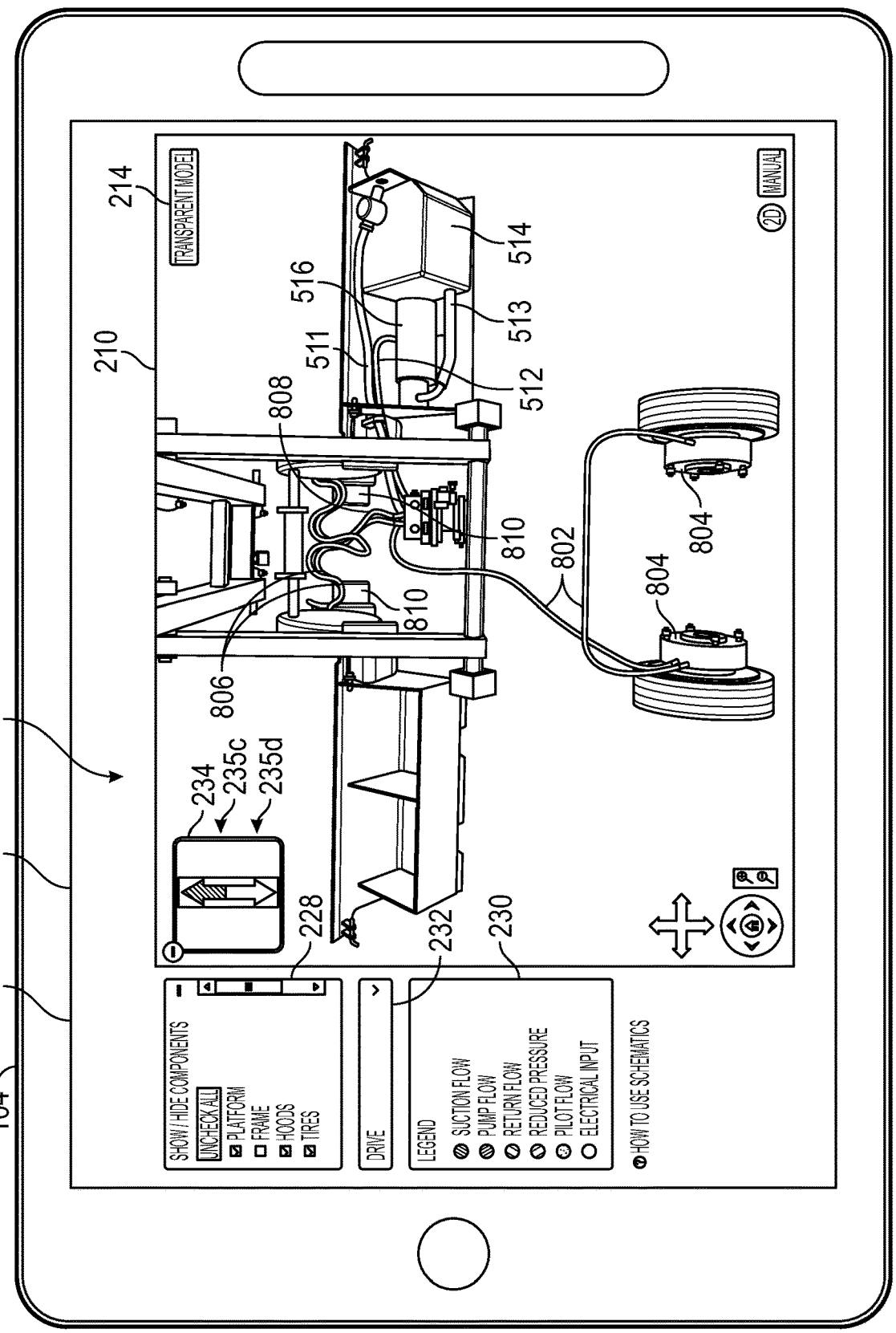
FIG. 8 shows a user device displaying a graphical user interface during operation of the application of FIG. 1, according to some embodiments.

Referring now to FIG. 8, the user device 104 is shown during operation of the application 114 after the user 102 has selected a different function and sub-selection 235. Here, the user 102 has selected the Drive function from the function selection menu 232. This causes causing the application 114 to update the GUI 206 to change the directional selector 234 to display sub-selections 235c and 235d, corresponding to forward drive and reverse drive, respectively. The user 102 has selected sub-selection 235c, which causes the hydraulic components corresponding to driving the scissor lift forward to appear. The user 102 has also deselected the check box corresponding to the scissor lift frame in the show/hide toggle window 228, causing the frame of the 3D model 212 to be hidden and allowing better visibility of the hydraulic components. Selection of the forward drive sub-selection 235c allows the user 102 to see the hydraulic hoses 802 connecting the main control valve 510 to the hydraulic brakes 804. The hoses 802 may be displayed in red, which the legend 230 may indicate corresponds to pump flow. The hydraulic hoses 806, 808 connecting the hydraulic motors 810 to the main control valve 510 are also shown. The drive hoses 806 may be shown in red, while the return hose 808 may be shown in blue. Again, the legend 230 indicates that red corresponds to pump flow and blue corresponds to return flow. The hydraulic hose 512 connecting the hydraulic pump 516 to the main control valve 510 may be shown in red, the hydraulic hose 511 connecting the hydraulic tank 514 to the main control valve 510 may be shown in blue, and the hydraulic hose 513 connecting the hydraulic pump 516 to the hydraulic tank 514 may be shown in green. Again, the legend 230 indicates that red corresponds to pump flow and blue corresponds to return flow, and the legend also indicates that green corresponds to suction flow.

As the user makes different selections from the function selection menu 232 and the directional selector 234, the components corresponding to the selections may appear or be emphasized. The components shown or emphasized in previous selections may be hidden or deemphasized when a new selection is made. In some embodiments, multiple selections may be made simultaneously, allowing components relating to different functions to be displayed or emphasized simultaneously. For example, the components relating to lifting the work platform and the components relating to forward drive may be shown simultaneously. In some embodiments, there may be additional options relating to function subgroups. For example, selection of the forward drive sub-selection 235c may cause the application 114 to update the GUI 206 to show both hydraulic and electrical components relating to driving the scissor lift forward. The GUI may display additional selectors (e.g. check boxes, toggles, etc.) allowing the user 102 to separately hide or show (emphasize or deemphasize, etc.) the electrical components or the hydraulic components.

Figure 9:
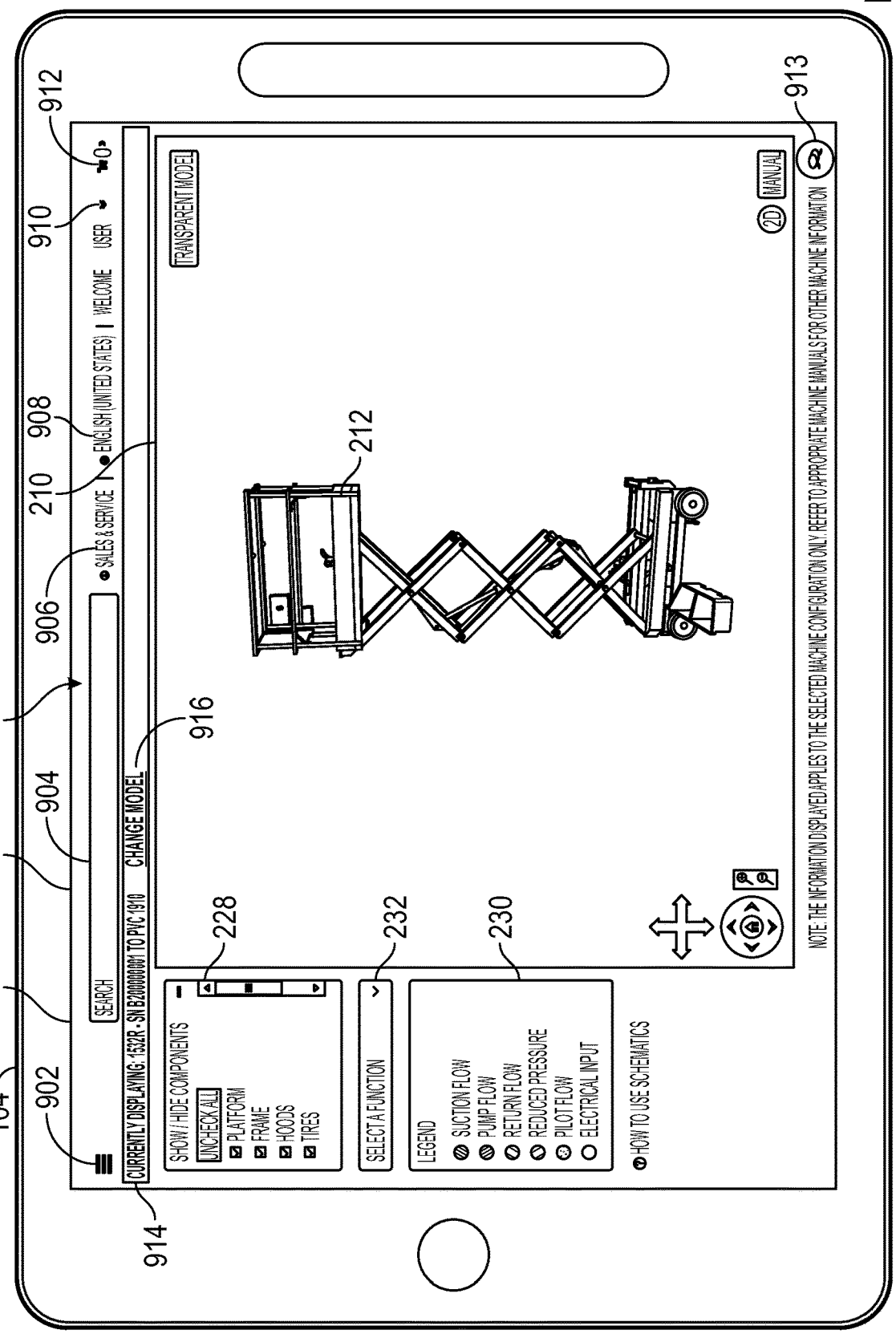
FIG. 9 shows a user device displaying a graphical user interface during operation of the application of FIG. 1, according to some embodiments.

Referring now to FIG. 9, the user device 104 is shown during operation of the application 114. Here, the application 114 shows additional menu options and features. The application 114 displays GUI 206 which includes a main menu button 902, a search bar 904, a sales and service button 906, a language selector 908, a user profile button 910, a shopping cart button 912, a contact button 913, a product information indicator 914, and a change model button 916. Selection of the main menu button 902 may cause a drop down menu to appear that allows the user 102 to navigate to various portions of a supplier website. The user 102 may select the search bar 904 and enter text via a keyboard (touchscreen keyboard, speech to text, etc.) to search the supplier website. Selection of the sales and service button 906 may cause a window to appear with additional contact information for the supplier. Selection of the language selector 908 may cause alternative language selections for the application 114 to appear. Selection of the user profile button 910 may allow the user 102 to sign out of the application 114 or see additional options. Selection of the shopping cart button 2012 may cause a list of items added to the digital shopping cart to appear. The list of items may include the components added to the digital shopping cart via the info window 702 inside the 3D navigation window 210. Selection of the contact button 913 may provide the customer with a fillable form that allow the customer to enter various information (e.g. contact information, product questions, etc.). The customer may then submit the form to the supplier. The product information indicator 914 may display information about the equipment represented by the selected 3D model 212.

The change model button 916 may allow the user to replace the selected 3D model 212 with a 3D model of an alternate piece of equipment. Referring now to FIG. 10, the user device 104 is shown during operation of the application 114 after the change model button 916 has been selected. Selection of the change model button 916 may cause the application 114 to update the GUI 206 to display an equipment selection window 1002. The equipment selection window 1002 may also appear when the application 114 is first loaded, such that the user 102 may select a first piece of equipment to view. The equipment selection window 1002 may include a list of equipment from the equipment database 110 that have 3D models available. The equipment selection window 1002 may include several selection menus, for example, an equipment type menu 1004, a model number menu 1006, and a serial range menu 1008. The menus may include graphical selections, as shown in the equipment type menu 1004, drop down menus, as shown in the model number menu 1006 and the serial range menu 1008, or any other type of menu allowing the user 102 to make selections. In some embodiments, selection of an option in a first menu may change the options in the other menus. For example, selecting scissor lifts in the equipment type menu 1004 may cause the model number menu 1006 to include only model numbers of scissor lifts. The equipment selection window 1002 may include a view schematics button, selection of which causes the application 114 to update the GUI 206 to display the 3D navigation window with the 3D model of the equipment selected via the selection menus 1004, 1006, 1008.

Figure 11:
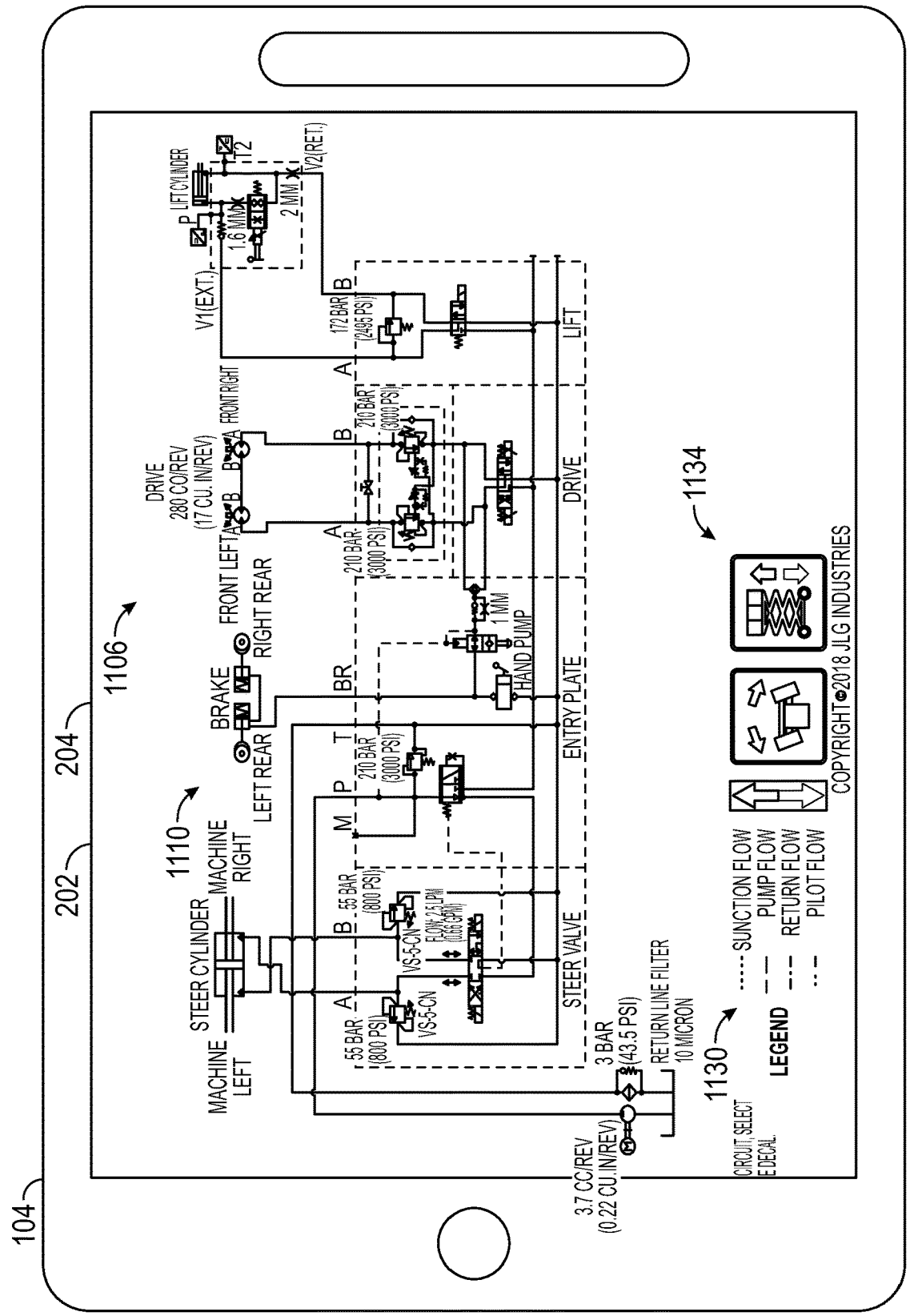
FIG. 11 shows a user device displaying a graphical user interface during operation of the application of FIG. 1, according to some embodiments.

Referring now to FIG. 11 the user device 104 is shown during operation of the application 114 after the 2D schematic button 224 has been selected. The GUI 206 is replaced by GUI 1106, which includes a 2D schematic 1110 of one or more systems (e.g. hydraulic system, electrical system etc.) of the selected equipment that was previously shown as a 3D model 212. The GUI 1106 may also display a legend 1130 indicating a color code for the 2D schematic 1110. The GUI 1106 may also display one or more directional selectors 1134, which allow the user 102 to select a function and a direction, similar to the function selection menu 232 and directional selector 234 included when viewing the 3D navigation window 210. Selection of a direction on a directional selector causes the application to update the 2D schematic 1110 to emphasize the portion or portions of the 2D schematic relating to the selected function and direction.

Figure 12:
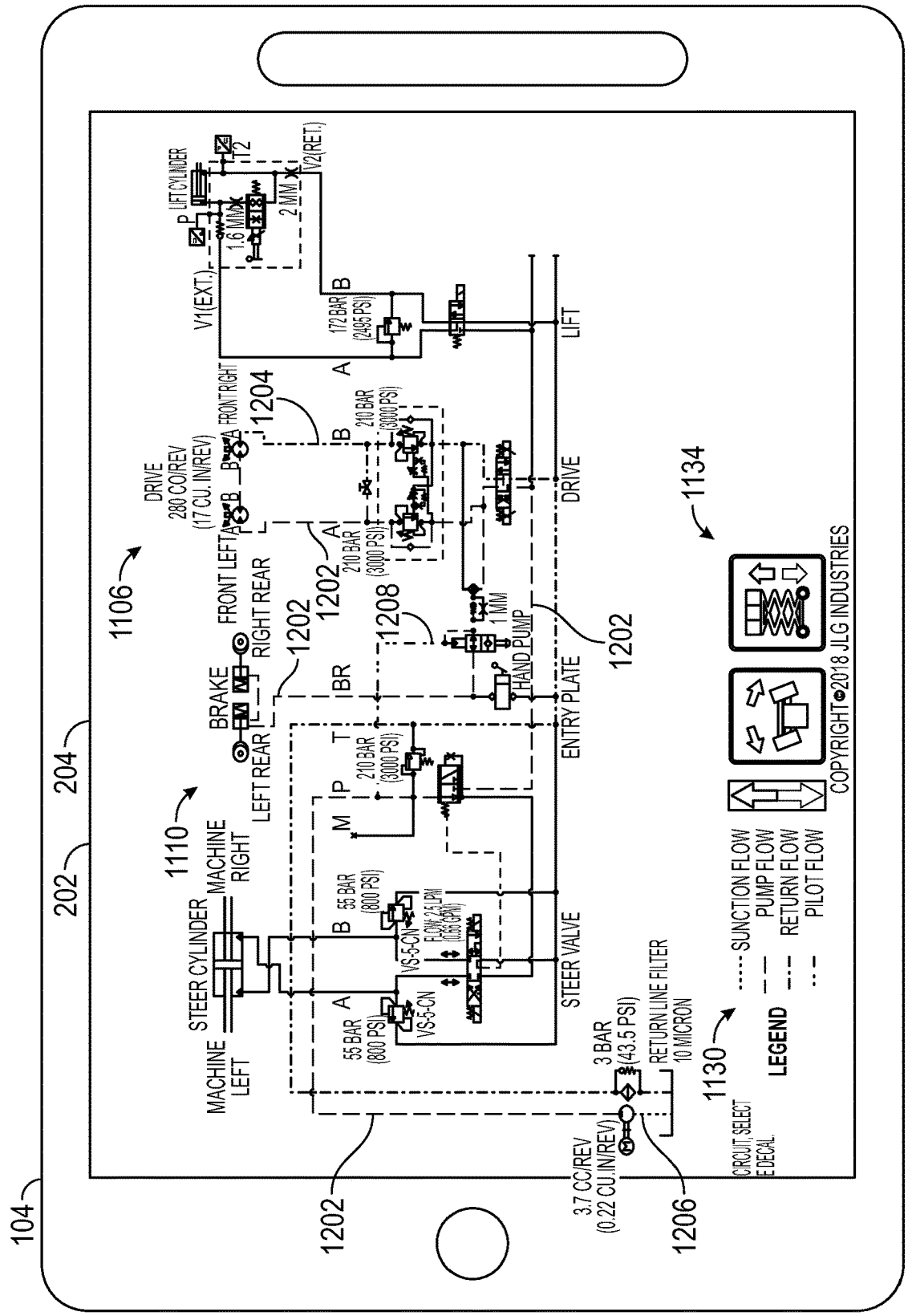
FIG. 12 shows a user device displaying a graphical user interface during operation of the application of FIG. 1, according to some embodiments.

Referring now to FIG. 12 the user device 104 is shown during operation of the application 114 after a function and direction have been selected in a directional selector 1134. Here, the user 102 has selected the drive function and the forward directions and the 2D schematic 1110 is a hydraulic system schematic. The 2D schematic 1110 has updated to emphasize the hydraulic lines that are related to driving the equipment forward. The related hydraulic lines may be shown as thicker than before the selections were made and may be shown in color. Pump flow hydraulic lines 1202 may be emphasized in red, return flow hydraulic lines 1204 may be emphasized in blue, and suction hydraulic lines 1206 may be emphasized in green, and pilot flow hydraulic lines 1208 may be shown in dashed orange. The legend 1130 may indicate to the user which color relates to which type of hydraulic line, thus allowing the user 102 to identify the function represented by the various lines in the 2D schematic 1110.

Figure 13:
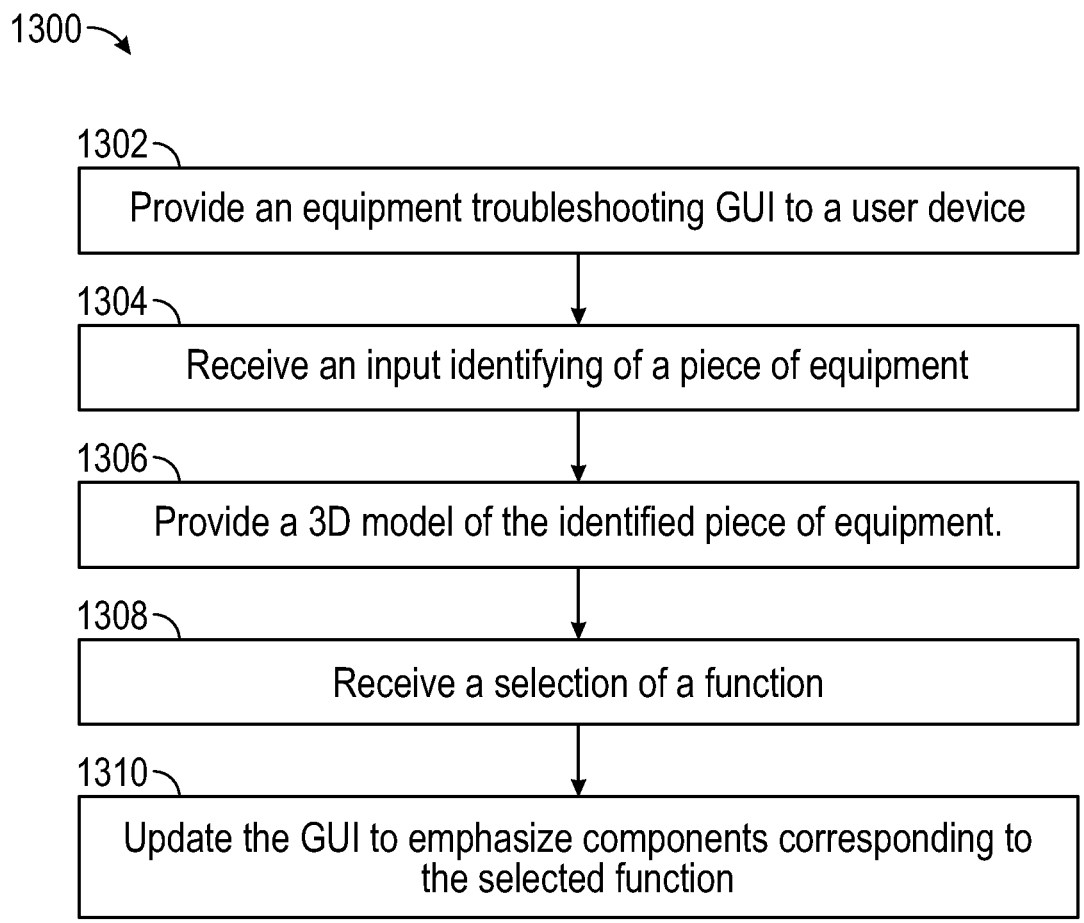
FIG. 13 is a flow diagram of a process for troubleshooting a piece of equipment, which may be performed by the application of FIG. 1, according to some embodiments.

Referring now to FIG. 13, a process 1300 for troubleshooting a piece of equipment is shown, according to an exemplary embodiment. Process 1300 may be implemented by the application 114 on the server 112 or on the user device 104. At operation 1302, a troubleshooting GUI (e.g. GUI 206) may be provided. The GUI 206 may be displayed on the display screen of a user device 104 as described above. The user 102 may interact with the GUI by entering inputs into the user device (e.g. by touching a touchscreen, clicking with a mouse, etc.). The GUI may include one or more options allowing the user 102 to select a piece of construction equipment. The user 102 may select a piece of equipment the user wishes to maintain, troubleshoot, or repair. In some embodiments, the GUI 206 may include a search bar allowing the user 102 to search for the equipment to select. In some embodiments, the user may first choose a type of equipment from a list. Selection of the type of equipment may cause a list of model numbers corresponding to that type of equipment to appear. The user may then select a model number from the list. Selection of the model number may cause a list of serial number ranges to appear. The user may then select a serial number range. At process 1304, an input identifying a piece of equipment is received (e.g. by type, model number, and serial number range etc.). In some embodiments, the user may use the camera of the user device to detect the identity of the equipment. For example, the application 114 able to detect an equipment decal on the real-world equipment in a photo or video stream and determine the identity of the equipment. The decal may be, for example a text based decal, a barcode, or a QR code. In other embodiments, the application 114 may detect the equipment based on the shape of the equipment based on the received images from the camera.

In response to receiving the input identifying the equipment, at operation 1306, a 3D model 212 of the identified piece of equipment may be provided and displayed on the GUI 206. The 3D model 212 may be displayed in a 3D navigation window 210, as described above. The user 102 may be able to manipulate the position, orientation, and size of the 3D model 212 as described above.

The GUI 206 may display several function options that the corresponding equipment may perform (e.g. a drive function, a steer function, etc.). The functions may include sub-functions (e.g. forward drive, reverse drive, etc.). In some embodiments, the user 102 may first select a function, which may cause the GUI 206 to display sub-functions of that function. At operation 1308, a selected function is received.

At operation 1310, in response to the selection of a function, the GUI is updated to emphasize components related to the selected function. As described above, emphasizing a component may include brightening the component, changing the color of the component, enlarging the component, causing the component to appear after being in a hidden state, or any other method of visually bringing the component to the user's attention. The emphasized components may be within a subset of components, for example, electrical components, hydraulic components, hydraulic hoses, etc.

After the GUI is updated to emphasize components related to the selected function, the user may manipulate the 3D model 212 to improve the visualization of the components to aid in the maintenance, troubleshooting, and repair of the equipment. In some embodiments, the application may receive a selection of a component of the 3D model 212 and, in response to receiving the selection, may display additional information about the component. In some embodiments, in response to receiving the selection of a component, the application 114 may allow the user to add the component to a digital shopping cart for purchase. In some embodiments, the user may select a 2D schematic button 224 within the GUI 206. Selection of the 2D schematic button 224 may cause the application to display 2D schematics of the selected equipment. The 2D schematics may include a second list of functions and sub functions, selection of which causes the portions of the 2D schematic corresponding to the selected function to be emphasized similar to the methods described above with respect to the 3D model 212. In some embodiments, the application 114 may update the GUI 206 to display a text-based maintenance manual in response to a selection by the user 102.

Using the methods described above, a user 102 responsible for maintaining, troubleshooting, or repairing a piece of equipment may open the application 114 using the user device 104. Within the application 114, the user 102 may select a 3D model 212 corresponding to the piece of equipment. The application 114 can display the 3D model 212 on the user device 0. The user 102 may choose a function causing components corresponding to that function to be emphasized on the 3D model 212. The user 102 may then use the model 212 to get a clear view of the emphasized components of the 3D model 212 to identify the corresponding components on the equipment. The user 102 may also access the 2D schematics and/or the text-based maintenance manual within the application 114 to further aid in troubleshooting the equipment. Using the application 114 and methods described herein, the user 102 may be provided with enhanced visualizations of the equipment the user 102 seeks to maintain, troubleshoot, or repair. The user 102 may be able to better identify and inspect components using these enhanced visualizations.

Augmented Reality Maintenance

Throughout the life of a construction project, various pieces of construction equipment are required to perform various tasks. Modeling of the equipment can allow the equipment users (e.g., technicians, construction workers, etc.) to more easily inspect, maintain, troubleshoot, and repair a piece of equipment prior to using the equipment at the worksite. A digital twin of a particular piece of equipment may be provided that includes a 3D model of the equipment and telemetric data from sensors embedded in the equipment.

Augmented reality (AR) may be used to place digital objects into a live video feed of the real world and display the combined video feed on a display screen of a user device (e.g., a tablet computer, smartphone, laptop, smart TV, head-mounted display, etc.). In some embodiments of the present application, an AR application may overlay (e.g., superimpose, align, etc.) a digital twin of a piece of equipment onto a live video feed of the equipment. This can allow sensor measurements to appear overlaid onto the live video feed of the real-world equipment and can allow a user to select a component of the equipment on the live video feed and see more information about the component. Various components of the digital twin can be shown and emphasized on the live video feed so a user may be able to better identify and inspect the components. The AR application may allow a user to select a function of the equipment and the AR application may display and emphasize components of the digital twin associated with the selected function. Instructions for inspecting and repairing the equipment can be overlaid on the live video feed with visual indicators that can make the inspection and repair easier for the user. The AR application may be able to automatically detect the identity of the equipment and load the digital twin by recognizing the shape of the equipment or a decal affixed to the equipment.

Figure 14:
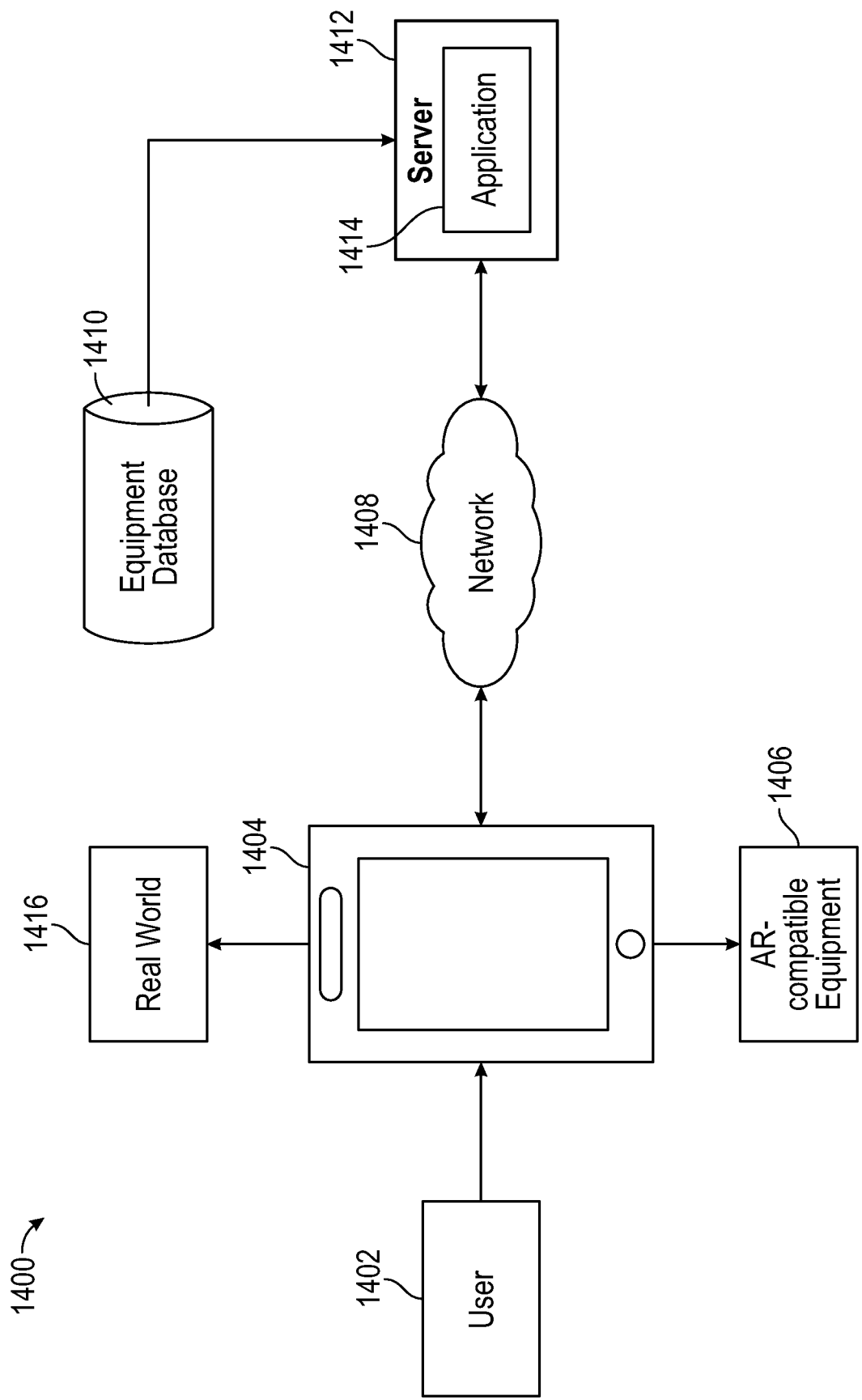
FIG. 14 is a block diagram of a modeling system, according to some embodiments.

Referring now to FIG. 14, a system 1400 for implementing an augmented reality (AR) application for equipment is shown, according to an exemplary embodiment. System 1400 may be a system for modeling equipment (e.g., lifts, boom lifts, scissor lifts, etc.) to facilitate predictable and reliable operation of the equipment at the worksite. System 1400 is shown to include user 1402, user device 1404, AR-compatible equipment 1406, network 1408, equipment database 1410, sever 1412, application 1414, and real world 1416. System 1400 may be substantially similar to system 100, except as shown and described.

User 1402 may include any individual capable of engaging with the application (e.g., AR application, etc.) via one or more user devices 1404. In an exemplary embodiment, user 1402 is a technician responsible for modeling, inspecting, and/or troubleshooting the equipment (e.g., AR-compatible equipment 1406, etc.). In other embodiments, user 1402 includes equipment operators, foreman, customers, and other individuals that may be associated with the project for which the equipment 1406 is needed.

User device 1404 may be configured to display the AR application 1414. In some embodiments, user device 1404 is a smartphone, tablet, or other portable processing device. In other embodiments, user device 1404 is a head-mounted display. In other embodiments, user device 1404 is a workstation capable of providing the AR application 1414 to a monitor for display/interaction. User device 1404 may include several devices that allow more than one user to engage with the AR application 1414. In such an embodiment, user device 1404 may refer to multiple smartphones or multiple tablets for technicians at a worksite. User device 1404 is shown as a tablet computer in FIGS. 16-22.

AR-compatible equipment 1406 may include one or more pieces of equipment that have been analyzed and have had their equipment information (e.g., manuals, technical drawings, CAD models, digital twins, etc.) stored such that the equipment information may be incorporated into the AR application 1414. AR-compatible equipment 1406 may include boom lifts, scissor lifts, vertical lifts, and other equipment and/or lifts for construction. For example, a boom lift model may have an operating manual, a digital twin, and a technical specification. These files are stored on a database (e.g., equipment database 1410) and queried by the AR application. When selected by the user, the AR application may provide the operating manual, digital twin, and technical specification of the boom lift to user 1402 via the user interface of user device 1404.

The equipment information may include a digital twin of the AR-compatible equipment 1406. The digital twin is a virtual representation that serves as the real-time digital counterpart of the AR-compatible equipment 1406. The digital twin may appear within the application as a 3D model (CAD model, etc.) of the AR-compatible equipment 1406. The AR-compatible equipment 1406 may include a controller configured to receive information from sensors and/or control units disposed in various locations on the AR-compatible equipment 1406. The controller may be disposed in any suitable location on AR-compatible equipment 1406. The information from the sensors is received and processed by the controller and transmitted to a remote server (e.g. server 1412) via a wireless radio of the controller. The server 1412 includes the digital twin of the AR-compatible equipment 1406 and receives the information from the controller. The application 1414 can model the information on the digital twin. The information may include, for example, pressure information relating to hydraulic systems, position information relating to mechanical features (e.g. boom extension and angle of a boom lift, work platform height of a scissor lift) and electrical readings (e.g. voltage across a motor, etc.). The digital twin may be accessed through the server 1412 via the application 1414 on user device 1404. The digital twin may allow the user 1402 to monitor a live view of the AR-compatible equipment 1406, and may write time series information from the sensors to the equipment database 1410. In some embodiments, the user 1402, by interacting with the digital twin in the application 1414 may send commands to the controller via the wireless radio of the controller. The commands sent to the controller may be commands corresponding to the control units and may adjust an operation of the control units of the AR-compatible equipment 1406, resulting in adjusted operation of the equipment 1406.

As an example of the foregoing, the application 1414 may use the sensor information to adjust the digital twin such that the digital twin is in the same physical configuration as the AR-compatible equipment 1406. For example, if position sensors detect that the boom of a boom lift is extended 20 feet at a 25 degree angle, the application 1414 may update the digital twin such that the boom of the digital twin is also extended 20 feet at a 25 degree angle. Other sensor information (e.g. pressure, voltage, etc.) may be displayed on the screen 1502 in the location of the sensor. In other embodiments, the user 1402 may select a component, causing the application to display any sensor information relating to the selected component. For example, the user 1402 may select a hydraulic hose on the digital twin by touching the hose on the touchscreen 1504 of the user device 1404. In response to the selection, the application may update the digital twin to display the pressure sensor information for the selected hose. In addition to the functions discussed in this section, the AR application 1414 may also be configured to perform the functions of the AR application 114 discussed above. Similarly, the AR application 114 may be configured to perform the functions of the AR application 1414 discussed herein.

Network 1408 may include one or more routers configured to route data from server 1412 to user device 1404. In some embodiments, network 1408 spans several buildings or regions such that server 1412 is located off-premise from user device 1404 and/or AR-compatible equipment 1406. For example, server 1412 may be located at a datacenter and AR-compatible equipment 1406 is located in a building several hundred miles away. Network 1408 may connect these two locations via a collection of interconnected networks (e.g., the Internet, a cloud, etc.).

Equipment database 1410 may be a database configured to store information relating to various equipment including AR-compatible equipment 1406. In some embodiments, various equipment determined or selected to be compatible for the AR application have a set of information (e.g., technical manuals, technical specifications, CAD models, a digital twin, engineering drawings, etc.) that provide the operational details of the equipment. Equipment database 1410 may be configured to store this information and provide the information to the AR application (e.g., application 1414) upon request. Equipment database 1410 may be located locally (e.g., in the same building or region as AR-compatible equipment 1406) or off-premise. In other embodiments, equipment database 1410 is located within server 1412 and application 1414 does not need to query an external database for equipment information.

Server 1412 may be any platform configured to store, process, and secure data. In some embodiments, server 1412 is a database server configured to store and process application 1414. Application 1414 may be provided as software-as-a-service (SaaS). The software for application 1414 may be licensed to user 1402 to use on user device 1404, but application 1414 may remain hosted (e.g., stored, etc.) on server 1412. In other embodiments, application 1414 is stored and processed on user device 1404. In an exemplary embodiment, server 1412 is shown to query equipment information from equipment database 1410. While system 1400 shows application 1414 being hosted off-premise, the hosting and processing may be performed on user device 1404 or a local sever.

Figure 15:
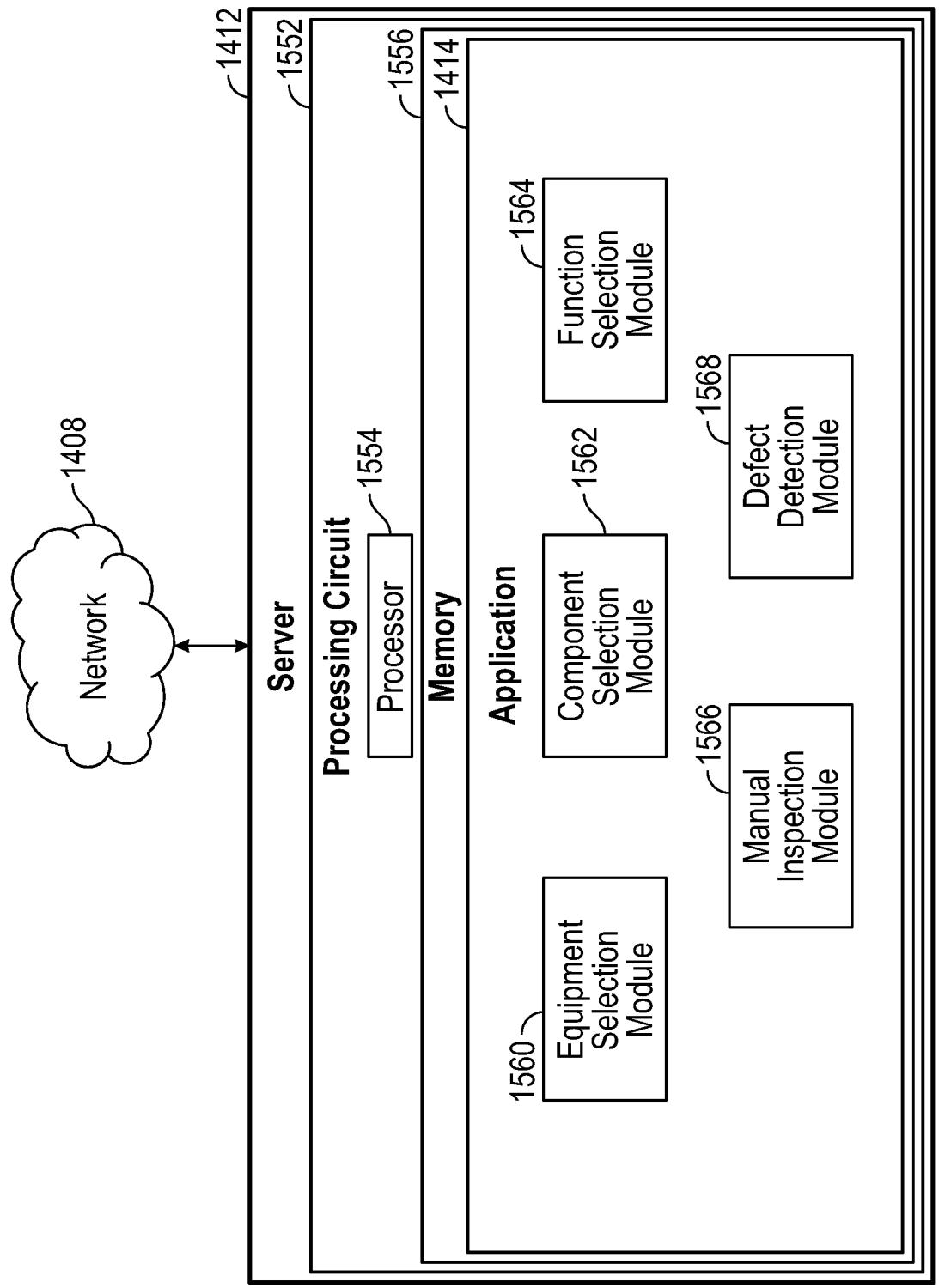
FIG. 15 is a detailed block diagram of the server of FIG. 1, according to some embodiments.

Referring now to FIG. 15, a detailed block diagram of server 1412 is shown, according to an exemplary embodiment. Server 1412, as shown in FIG. 2, may be connected within system 1400 in similar fashion as shown in FIG. 14. Server 1412 is shown to include processing circuit 1552 including processor 1554 and memory 1556. Processing circuit 1552 can be communicably connected to server 1412 such that processing circuit 1552 and the various components thereof can send and receive data via a communications interface. Processor 1554 can be implemented as a general purpose processor, an application specific integrated circuit (ASIC), one or more field programmable gate arrays (FPGAs), a group of processing components, or other suitable electronic processing components.

Memory 1556 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 1556 can be or include volatile memory or non-volatile memory. Memory 1556 can include database components, object code components, script components, or any other type of information structure for supporting the various activities and information structures described in the present application. According to an example embodiment, memory 1556 is communicably connected to processor 1554 via processing circuit 1552 and includes computer code for executing (e.g., by processing circuit 1552 and/or processor 1554) one or more processes described herein. Memory 1556 is shown to include application 1414.

Application 1414 may include one or more programs or modules provided to an end user (e.g., user 1402, etc.). For example, the application may include an equipment selection module 1560, a component selection module 1562, a function selection module 1564, manual inspection module 1566, and defect detection module 1568. As used herein, application 1414, "the application," and "the AR application" may be used interchangeably. In some embodiments, application 1414 is implemented within a single computer (e.g., one server, one housing, etc.), such as server 1412 as shown in FIG. 2. In various other embodiments, application 1414 can be distributed across multiple servers or computers (e.g., that can exist in distributed locations). The application 1414 may be configured for inspecting, maintaining, troubleshooting and repairing the AR-compatible equipment 1406.

To use the application to inspect, maintain, troubleshoot, or repair a piece of AR-compatible equipment 1406, the user may first select a piece of equipment from the equipment database 1410. The application 1414 may include an equipment selection module 1560 to allow the user 1402 to select a piece of equipment 1406. Selection of the equipment 1406 may cause the application 1414 to display equipment information (e.g., 3D models, schematics, equipment manuals, etc.) about the selected equipment. In some embodiments, the user 1402 may select a piece of equipment by entering model number of the equipment into a search bar of the application 1414. In some embodiments, the user 1402 may select a piece of equipment from one or more lists or a menu. For example, the user 1402 may first select a type of equipment (e.g. scissor lifts, boom lifts, etc.). Selection of an equipment type may cause a list of model numbers to appear corresponding to equipment of that type. In some embodiments, a camera of the user device may be used to select the equipment. For example, the application 1414 may be able to detect an equipment decal on the real-world equipment 1406 and match the equipment decal with equipment information (e.g., 3D models, schematics, equipment manual, etc.). The decal may be, for example a text based decal, a barcode, or a QR code. In other embodiments, the equipment selection module 1560 may detect the equipment based on the shape of the equipment. For example, a user 1402 may point the camera of the user device 1404 towards a piece of equipment 1406 while using the application 1414, and the application 1414 may recognize the equipment using image processing and may download the equipment information (e.g. digital twin, manuals, etc.) without further input from the user 1402. A user may be able to save information about various pieces of equipment to the user device 1404 for use when the network 1408 is unavailable. In some embodiments, the user 1402 may select a piece of equipment from a list of digital twins of the AR-compatible equipment 1406 associated with the user. For example, a user 1402 may be an employee of a construction company and may log in to the application 1414. The application 1414 may then display a list of digital twins of AR-compatible equipment 1406 owned by the construction company for the user 1402 to select. Selection of a digital twin from the list may cause the application 1414 to display the digital twin, and may allow the user 1402 to overlay the digital twin on a live image of the real-world equipment 1406.

Figure 16:
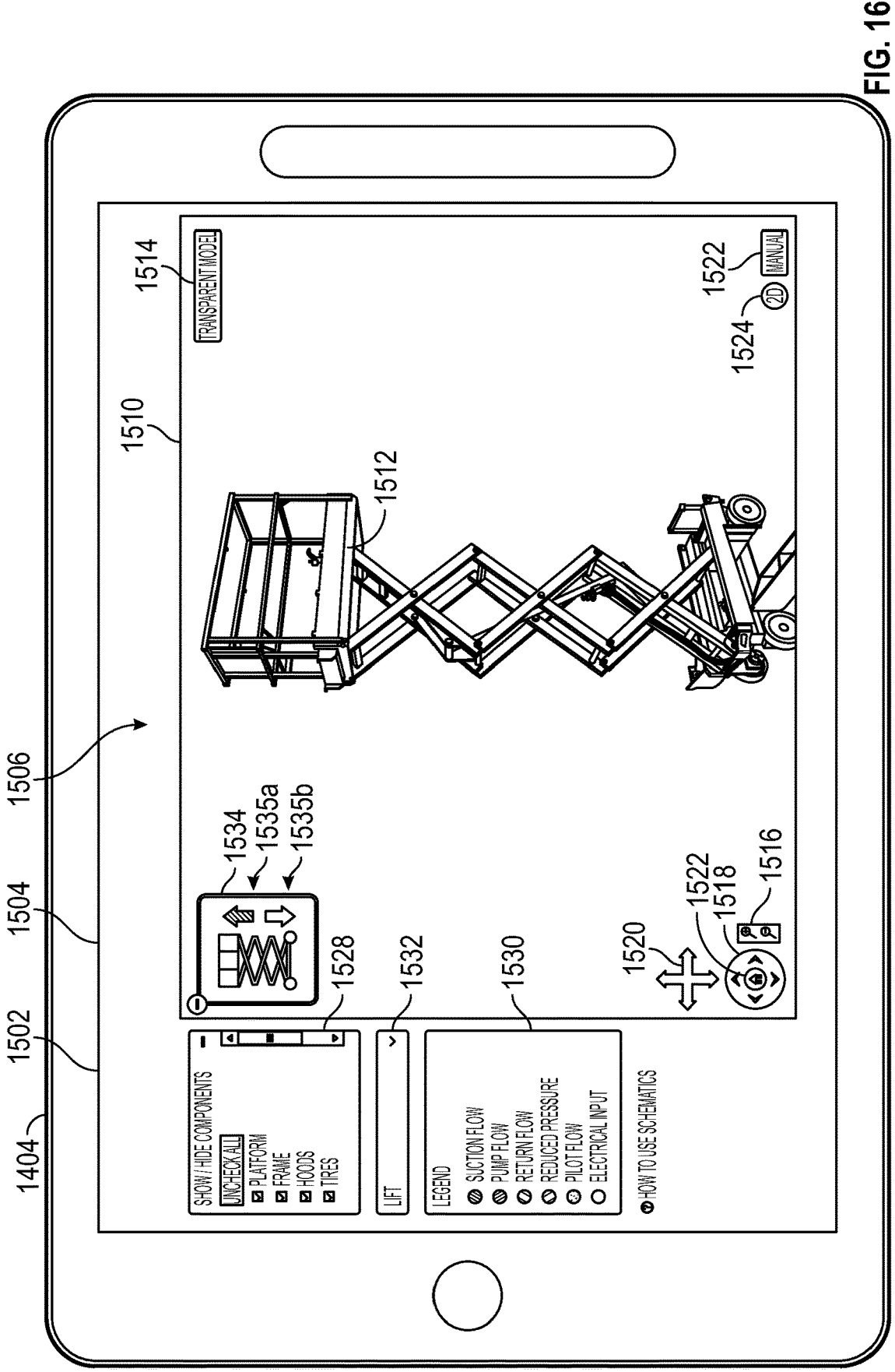
FIGS. 16-22 show a user device shown during operation of an augmented reality application, according to some embodiments.

Referring now to FIG. 16, a user device 1404 is shown during operation of the application 1414, according to some embodiments. As shown in FIG. 16, user device 1404 is a tablet computer. User device 104 may be substantially similar to user device 1404. The user device 1402 includes a display screen 1502 configured to display an equipment troubleshooting GUI 1506 generated by the application 1414. The display screen 1502 may include a touchscreen 1504, the touchscreen 1504 may be configured to receive inputs from a user. A user may provide inputs to the touchscreen 1504 by touching the touchscreen 1504 with one or more fingers to interact with the GUI 1506. In other embodiments, the user 1402 may interact with the GUI 1506 via a mouse, keyboard, or other computer interface device. The GUI 1506 may include a 3D navigation window 1510 configured to show a digital twin 1512 of a piece of building equipment selected by the user 1402 In the example shown in FIG. 3, the digital twin 1512 is a scissor lift. The digital twin 1512 may include various electrical, hydraulic, and mechanical components that make up the equipment 1406.

The 3D navigation window 1510 may include a number of controls allowing the user 1402 to submit manipulation commands to the application to manipulate the appearance, position, and orientation of the digital twin 1512 within the window 1510. It should be understood that any of these controls may be located outside the 3D navigation window (e.g. to the left or right of the 3D navigation window 1510, etc.). The 3D navigation window 1510 may include a transparency toggle 1514. Selecting the transparency toggle 1514 (e.g. by touching the touchscreen where the transparency toggle 1514 is being displayed, by clicking the transparency toggle with a mouse, etc.) may cause one or more components of the digital twin 1512 to become at least partially transparent. This may improve visibility of certain internal components that may be blocked by other components. For example, selecting the transparency toggle 1514 may cause the mechanical components of the scissor lift (e.g. the wheels, base, linkages, platform, etc.) to become partially transparent such that the hydraulic and electrical components can be seen through the mechanical components. Selecting the transparency toggle 1514 when components are hidden may return the components to a non-transparent state.

The 3D navigation window 1510 may include a zoom control 1516. The zoom control 1516 may include a zoom-in button and a zoom-out button. Selecting the zoom-in button may send a zoom command causing the application to adjust the GUI to zoom in on the digital twin 1512 within the 3D navigation window 1510. This may cause the digital twin 1512 to appear larger in the 3D navigation window 1510. Selecting the zoom-out button may cause the application to adjust the GUI 1506 to zoom out from the digital twin 1512 within the 3D navigation window 1510. This may cause the digital twin to appear smaller in the 3D navigation window. The user 1402 may perform the functions of zoom control 1516 in ways other than selecting the button in zoom control 1516. For example, the user 1402, on a tablet computer with a touchscreen 204 may zoom in to the digital twin 1512 by touching the tablet with two fingers and dragging the fingers closer together across the touchscreen 1504 (e.g. pinch-to-zoom). On a laptop computer, a user may zoom in by rolling a scroll wheel of a mouse toward the user, or by moving two fingers forward on a touchpad. The user 1402 may zoom out by performing the opposite actions.

The 3D navigation window 1510 may include a rotation control 1518. The rotation control 1518 may include an up, down, left, and right directional controls. Selecting the left or right directional controls may send a rotation command causing the application 1414 to adjust the GUI 1506 to rotate the digital twin 1512 about a vertical axis of the 3D navigation window 1510. Selecting the up or down directional controls may cause the application to adjust the GUI 1506 to rotate the digital twin 1512 about a horizontal axis of the 3D navigation window. The user 1402 may perform the functions of rotation control 1518 in ways other than selecting the directional controls. For example, the user 1402, on a tablet computer with a touchscreen 204 may rotate the digital twin 1512 by touching the touchscreen 1504 with one finger and dragging the finger across the touchscreen 1504. On a computer, a user may rotate the digital twin 1512 by clicking within the 3D navigation window 1510 and dragging the mouse while holding down the click button. On a laptop computer the user 1402 may rotate the digital twin 1512 by clicking within the 3D navigation widow 1510 and dragging a finger across a touchpad while holding the click button down.

The 3D navigation window 1510 may include a pan control 1520. The pan control 1520 may include an up, down, left, and right directional controls. Selecting the left or right directional controls may send a pan command causing the application to adjust the GUI 206 to move the digital twin 1512 left or right within the 3D navigation window 1510. Selecting the up or down directional controls may cause the application to adjust the GUI 1506 to move the digital twin 1512 up or down within the 3D navigation window. For example, selecting the left directional control may cause the digital twin 1512 to appear farther to the left within the 3D navigation window 1510 than before the left directional control was selected. The user 1402 may perform the functions of pan control 1520 in ways other than selecting the directional controls. For example, the user 1402, on a tablet computer with a touchscreen 204 may pan the digital twin 212 by touching the touchscreen 1504 with two finger and dragging the fingers across the touchscreen 1504. On a computer, a user may pan the digital twin 1512 by holding down a CTRL button and clicking within the 3D navigation window 1510, and then dragging the mouse while holding down the click button. On a laptop computer the user 1402 may pan the digital twin 1512 by holding down a CTRL button and clicking within the 3D navigation window 1510, then dragging a finger across a touchpad while holding the click button down.

The 3D navigation window 1510 may include a home button 1522. Selection of the home button 222 may cause the application to update the GUI 1506 to return the digital twin 1512 to a neutral starting position and orientation. As used herein, updating or replacing a GUI 1506 refers to changing the appearance and/or interactive features of the GUI 1506 as it appears on the display screen 1502 of the user device 1404. For example, selection of the home button 1522 may cause the 3D model to return to the center of the 3D navigation window 1510, in an upright orientation, and sized such that the entire digital twin 1512 is visible within the 3D navigation window 1510, as shown in FIG. 2. The user 1402 may perform the functions of the home button 1522 in ways other than selecting the home button 1522. For example, the user 1402, on a tablet computer with a touchscreen 1504 may return the digital twin 1512 to a neutral starting positon within the 3D navigation window by double-tapping the touchscreen 1504 with a finger. On a laptop computer, the user may double click a click button on a mouse or touchpad to return the digital twin 1512 to a neutral starting positon.

The 3D navigation window 1510 may also include a maintenance manual button 1523. Selection of the maintenance manual button 1523 may cause the application 1414 to update the GUI 1506 to replace all or a portion of the GUI with a text-based maintenance manual (e.g., a portable document format (PDF) file, etc.) for the building equipment corresponding to the 3D model. In some embodiments, a new GUI (e.g. a new window, a new tab, etc.) may be generated, while the GUI 1506 is preserved. The user may be able to toggle between the new GUI and GUI 1506 or both GUIs may be displayed on the display screen 1502 simultaneously. This allows the user 1402 to view the maintenance instructions for the equipment corresponding to the digital twin 1512 while viewing a specific portion of the digital twin 1512 in the navigation window 1510 of GUI 1506.

The 3D navigation window 1510 may include a 2D schematic button 1524. Selection of the 2D schematic button 1524 may cause the application 1414 to update the GUI 1506 to replace all or a portion of the GUI with a 2D schematic view of the building equipment corresponding to the digital twin 1512. For example, the 2D schematic may include a hydraulic schematic or an electrical schematic. In some embodiments, a new GUI (e.g. a new window, a new tab, etc.) may be generated, while the GUI 1506 is preserved. The user may be able to toggle between the new GUI and GUI 1506 or both GUIs may be displayed on the display screen 1502 simultaneously. This allows the user 1402 to view the 2D schematic for the equipment corresponding to the digital twin 1512 while viewing a specific portion of the digital twin 1512 in the navigation window 1510 of GUI 1506.

The GUI 1506 may also include a legend 1530 which may identify components of the digital twin 1512 via color coding or other visual identifiers (e.g. hatching, patterns, etc.). The name or type of component may be shown next to a color swatch identifying the color of the component in the 3D navigation window 1510. For example the legend may indicate that suction flow hydraulic components of the digital twin 1512 are shown in the 3D navigation window in green, while the pump flow hydraulic components are shown in red. This may aid the user 1402 in identifying the components of the building equipment corresponding to the digital twin 1512.

The GUI 1506 may also include a show/hide toggle window 1528. The show/hide toggle window 1528 may list one or more components of the digital twin 1512, each with a corresponding toggle button (e.g. radio button, check box, etc.). Selection of the toggle button may send a command causing the corresponding component to be hidden from the 3D navigation window. This may improve visibility of internal components of the 3D model. For example, the user may select the toggle button corresponding to the frame of a scissor lift. This may cause the frame to become invisible such that the components underneath the frame can be seen more easily. Selection of the toggle button for the second time may cause the component to return to the visible state from the hidden state.

The GUI 1506 may also include a how-to-use button 1531. The how-to-use button 1531 may cause the application 1414 to update the GUI 1506 to include instructions for interacting with the GUI 1506. For example, the GUI 1506 may be updated to explain the various features of the application 1414 and/or explain how the 3D model can be manipulated with various devices (e.g., touchscreen, mouse, touchpad, etc.).

The GUI 1506 may also include a function selection menu 1532. Selection of the function selection menu 1532 may cause the application to update the GUI 1506 to display a list of functions that may be performed by the building equipment corresponding to the digital twin 1512. For example, the functions of a scissor lift may include lifting the work platform, driving the lift, and steering the lift. In some embodiments, the function selection menu 1532 is a drop-down window. In some embodiments the list of functions may be visible without an initial selection of the function selection menu 1532. Selection of one of the function options may cause the application the update the GUI 1506 with an additional selection window, directional selector 1534.

In the example shown in FIG. 3, the lift option has been selected. The directional selector 1534 may contain one or more sub-selections 1535. The sub-selections 1535 may correspond to directions of movement. In the example shown in FIG. 3, sub-selection 1535a corresponds to moving the work platform of the scissor lift upward, while sub-selection 1535b corresponds to moving the work platform downward. In other examples, the sub-selections 1535 may correspond to driving forward and backward, turning left or right, extending or retracting a boom on a boom lift, turning on or turning off lights, or any other function that may be performed by the equipment 1406. In the example shown in FIG. 3 sub-selection 1535a, corresponding to lifting the work platform of the scissor lift, has been selected. In this example, selection of sub-selection 1535a causes the hydraulic hoses 1806, 1808 of the scissor lift digital twin 1512 to appear. In other examples, the hydraulic hoses 1806, 1808 may previously have been visible, and selection of sub-selection 1535a causes the hoses to be emphasized (e.g., by changing color, by becoming brighter, by changing from semi-transparent to fully visible, etc.). The emphasized components corresponding to the chosen sub-selection 1535 may be shown in colors corresponding to the legend 1530. For example, the legend 1530 may indicate that pump flow components are shown in red, while return flow components are shown in blue. Hydraulic hose 1806 may be a pump flow hose and may therefore appear in red, while hydraulic hose 1808 may be a return flow hose and may then appear in blue. The hydraulic hoses 1806, 1808 can be seen extending from the frame of the scissor lift to the hydraulic cylinder 1804.

Figure 17:
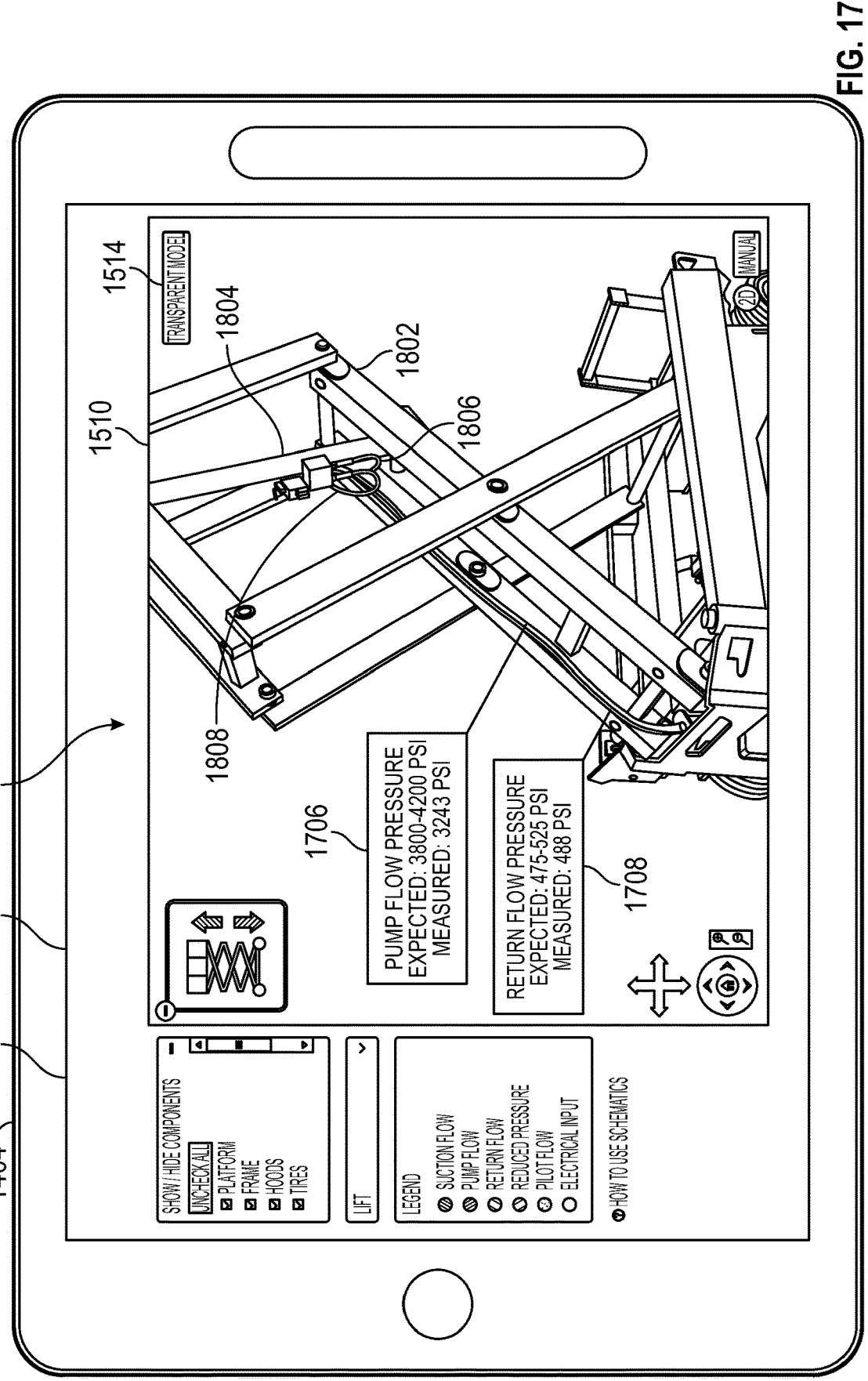

Referring now to FIG. 17, the user device 1404 is shown during operation of the application 1414 after the position and orientation of the digital twin 1512 within the 3D navigation window 1510 has been manipulated to focus on the linkages 1802 and the hydraulic cylinder 1804 of the scissor lift digital twin 1512. The user 1402 may select a component and may see live sensor measurements from the real-world equipment 1406 counterpart of the digital twin along with an expected range for that measurement. For example, the user 1402 may select the hydraulic hoses 1806, 1808 causing the application 1414 to display component data windows 1706 and 1708. In the example shown, component data window 1706 is configured to display an expected pressure range and the measured pressure of the pump flow hydraulic hose 1806. In the example shown, component data window 1708 is configured to display the expected pressure range and the measured pressure of the return flow hydraulic hose 1808. The application 1414 may be configured to alert the user 1402 if a measured value is outside the expected measurement range, as this may indicate a problem with the associated component or subsystem. In the example shown, the measured value in component data window 1706 (3243 psi) is outside the expected range (3800-4200 psi). The application 1414 may alert the user that the measured value is outside of the expected range, for example, by thickening the outline of the window 1706, changing the color or brightness of the window 1706, or causing an alert message to appear. In some embodiments, the sensor measurements may be displayed without a selection of a component by the user 1402. For example, all measurements may be displayed simultaneously, or all measurements relating to a selected function may be displayed.

The application 1414 may be configured for inspecting, maintaining, troubleshooting and repairing the AR-compatible equipment 1406. In some embodiments, the AR troubleshooting module may overlay a 3D model or digital twin of the AR-compatible equipment 1406 over a live image of the real-world equipment 1406 on the screen of the user device. For example, the user 1402 may make a selection to enter an augmented reality portion of the application 1414. The user 1402 may then hold the user device so that a camera of the user device 1404 captures a live image of the equipment 1406 and the screen of the user device 1404 displays the live image. The application 1414 may then overlay the digital twin over the equipment 1406 and allow the user to view information about the equipment components as they look at the live image of the equipment 1406 on the screen of the user device 1404. The digital twin model may be partially or fully transparent or invisible.

Figure 18:
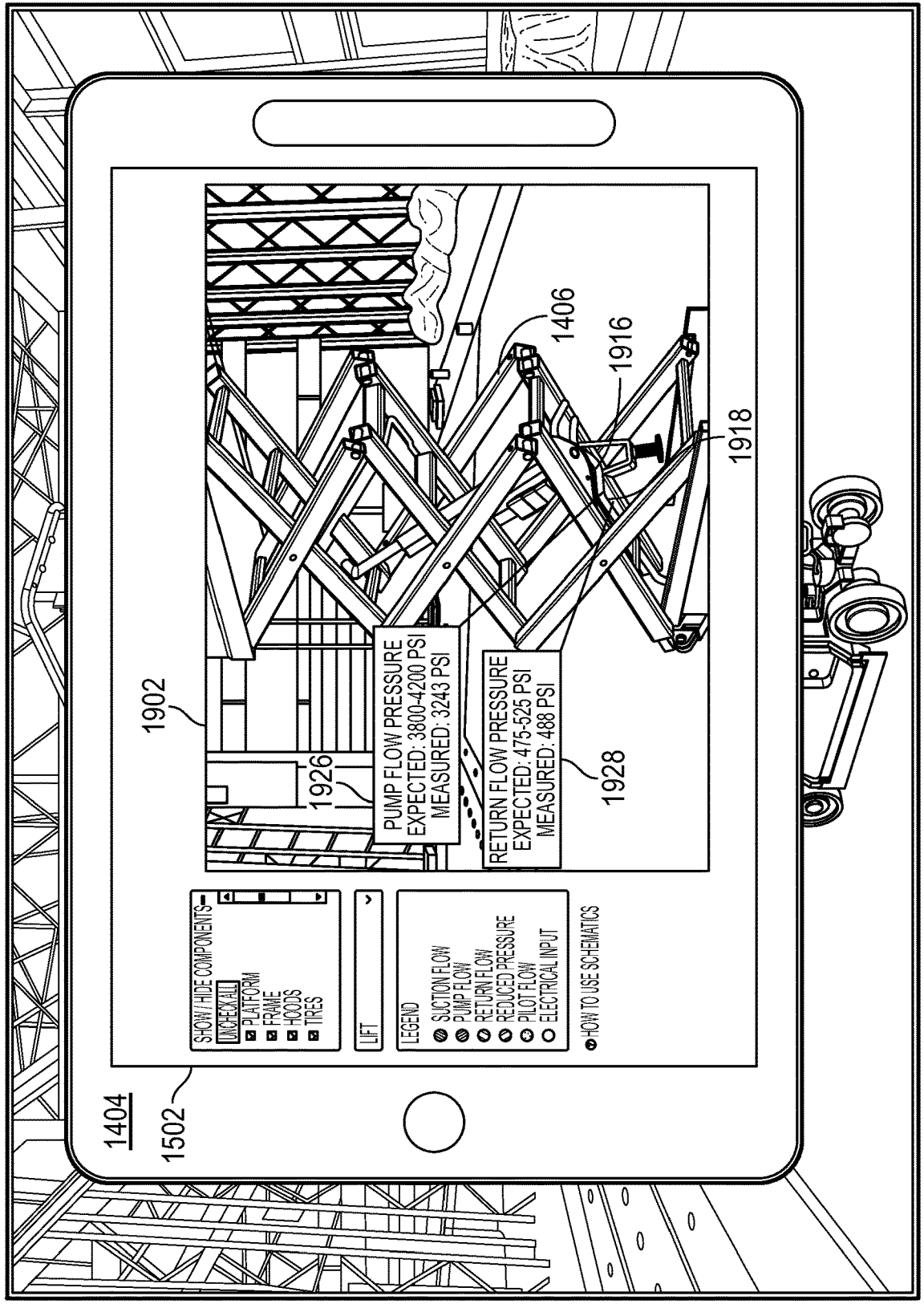

Referring now to FIG. 18, the user device 1404 is shown during operation of the application 1414, according to an example embodiment. Here, the user 1402 is holding the used device 1404 up to a real-world piece of equipment 1406. A camera of the user device 1404 may capture live images (e.g. video, a video stream, etc.) of the equipment 1406, and the live images 1902 may be displayed on the display screen 1502. The application 1414 may use image processing techniques to overlay a digital twin 1512 of the equipment 1406 onto the live image 1902 of the real-world equipment 1406. Here, the digital twin 1512 is fully invisible. However, because the digital twin 1512 is overlaid onto the image of the real-world equipment 1406, the component selection module 1562 may allow the user to select components of the real-world equipment 1406 by selecting (e.g., clicking with a mouse cursor, touching on a touchscreen, etc.) the component on the live image 1902 of the real world equipment 1406. The user 1402 can interact with the live image 1902 of the real-world equipment 1406 in essentially the same manner the user 1402 interacts with the digital twin 1512 in the embodiments described above.

Figure 19:
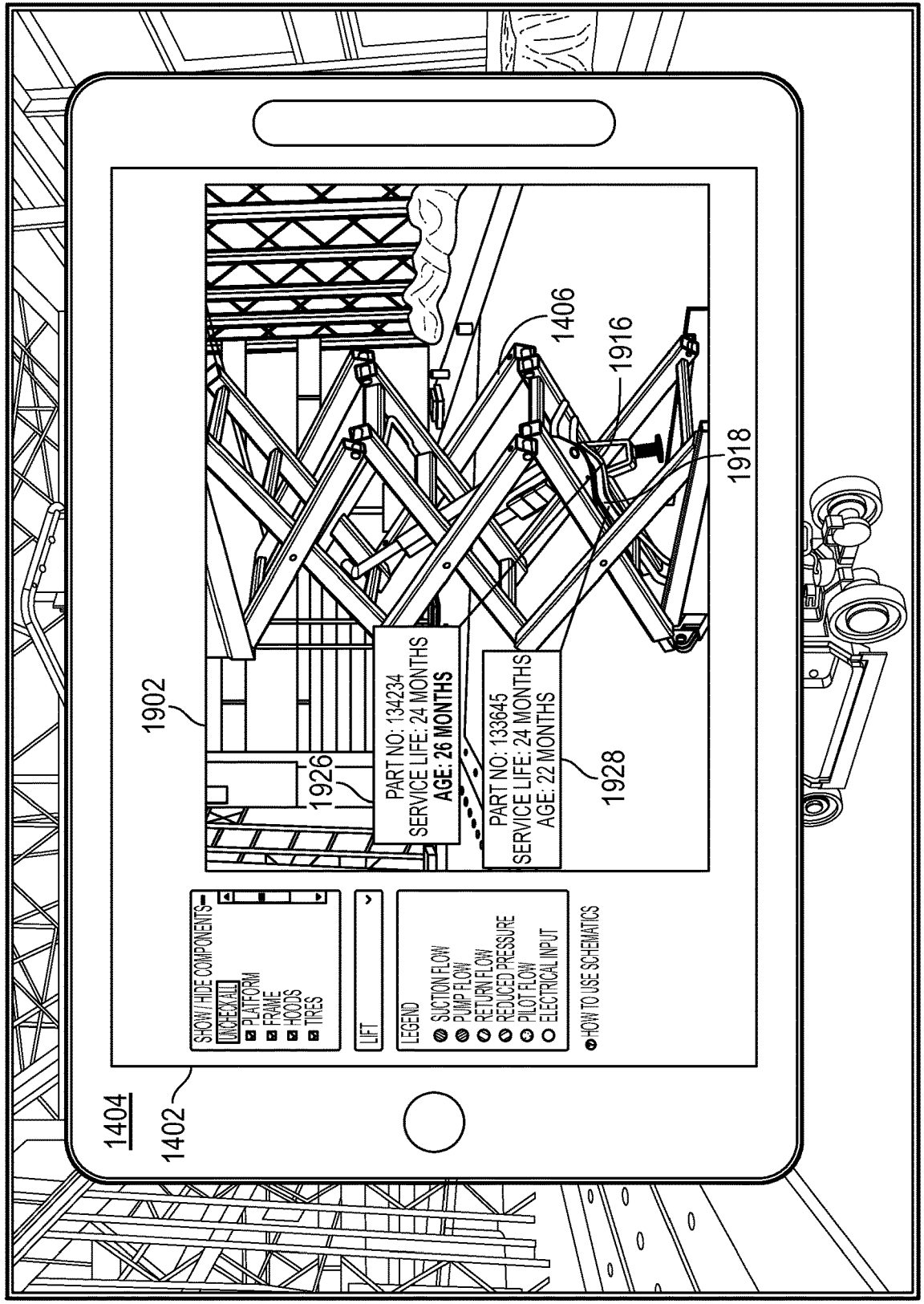

In the example shown, the user 1402 has selected a pump flow hydraulic hose 1916 and a return flow hydraulic hose 1918, similar to the hydraulic hoses 1806, 1808 selected on the digital twin 1512 in FIG. 17. As in FIG. 17, selection of the components may cause component data windows 1926 and 1928 to appear. Thus, the user 1402 may be able to see live sensor readings displayed over the live image 1902 of the real world equipment 1406. The user 1402 may then make repairs and adjustments or replace parts as necessary. The component data windows may display additional data that may aid in the maintenance and repair of the equipment 1406. For example, as shown in FIG. 19, the component data windows 1926, 1928 may show the part number, expected service life, and the service age of the selected component. In some embodiments, the component data windows 1926, 1928 may show other information associated with the selected component, such as a manufacture date, an installation date, a number of hours of active use of the component, and expiration date, or a repair date. The digital twin 1512 may include this information or may retrieve this information from a database for display in the component data windows 1926, 1928. The application 1414 may alert the user 1402, for example, by displaying an alert (e.g., a message or image) on the user interface, when the service age of the component exceeds the expected service life or another threshold value, indicating a replacement is necessary. In some embodiments, the component data windows may include selectable options (e.g. a selectable link) to purchase replacement parts or add the selected parts to a digital shopping cart.

As an example of the foregoing, a user 1402 may use the application to select the digital twin 1512 of the equipment 1406 the user 1402 wishes to inspect. The application 1414 may load the digital twin from the database 1410 onto the user device 1404. The user may select an option to enter augmented reality mode using the selected digital twin 1512. The user 1402 may point the camera of the user device 1404 toward the AR-compatible equipment 1406, causing the application 1414 to display a live image 1902 of the equipment 1406. The application 1414 may then overlay an invisible digital twin over the live image 1902 of the equipment 1406. The user 1402 may then select components by touching the live image 1902 on a touchscreen 1504 of the user device 1404, causing the application to display information about the selected component (e.g. sensor readings, part numbers, component service age, etc.). The user 1402 may determine whether any of the selected components needs to be repaired or replaced. The user may then move on to each other component to perform a complete inspection of the equipment 1406.

Figure 20:
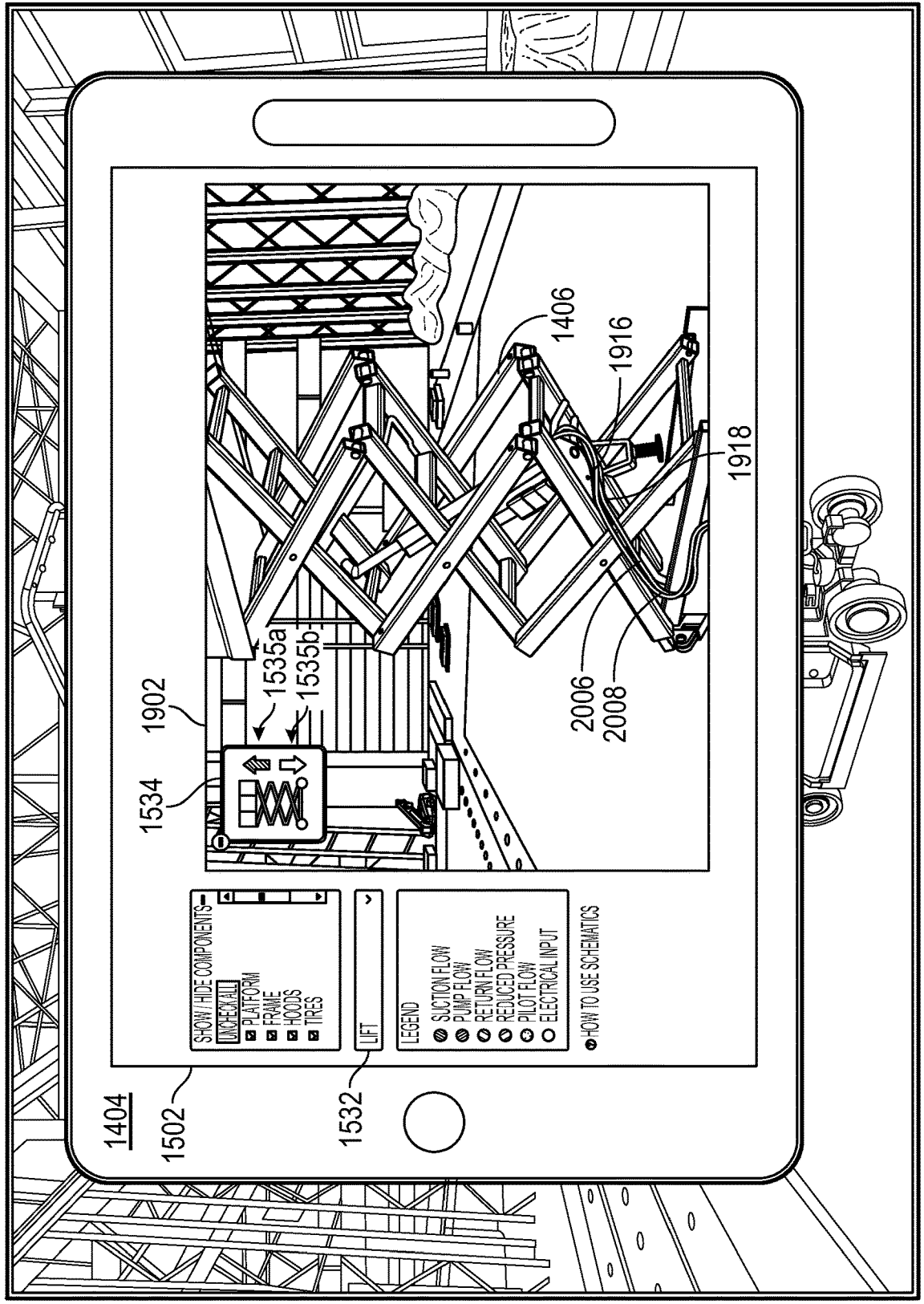

Referring now to FIG. 20, the user device 1404 is shown during operation of the application 1414, according to an example embodiment. The application 1414 is displaying the live image 1902 of the real world equipment on the display screen 1502 of the user device 1404. In some embodiments, the function selection module 1564 may allow the user 1402 to select a function from the function selection menu 1532, as described above with reference to FIG. 3. Here, the user 1402 has selected the lift function, causing directional selector 1534 to appear. The directional selector 1534 may contain one or more sub-selections 1535. The sub-selections 1535 may correspond to directions of movement. In the example shown in FIG. 20, sub-selection 1535a corresponds to moving the work platform of the scissor lift upward, while sub-selection 1535b corresponds to moving the work platform downward. In the example shown in FIG. 20, sub-selection 1535a, corresponding to lifting the work platform of the scissor lift, has been selected. Selection of sub-selection 1535a may cause components of the digital twin 1512 relating to the selected function to be emphasized on the display screen 1502. For example, the digital twin may be completely invisible prior to the selection of a function. When sub-selection 1535a is selected, the application 1414 may cause the hydraulic hoses of the digital twin associated with lifting the work platform to become visible. The now visible components of the digital twin 1512 may be shown as overlaid on the live image 1902 of the real-world equipment 1406.

The components may also be further emphasized to improve visibility. For example, the components may be displayed in bright colors, oversized, patterned, flashing, etc. In some embodiments, the emphasized components may be visible thorough or in front of the live image of the real-world equipment. In FIG. 20, selection of sub-selection 1535a causes the digital twin pump flow hose 706 to be overlaid onto the live image 1902 of the real-world equipment 1406 over the real-world pump flow hydraulic hose 1916. The digital twin return flow hose 2008 is overlaid onto the live image 1902 of the real-world equipment 1406 over the real-world pump flow hydraulic hose 1918. Here, the digital twin hydraulic hoses 2006, 2008 are shown in front of components of the real-world equipment 1406, including the linkages and base of the scissor lift, to allow for more visibility of the components. Because the digital twin components are overlaid onto the live image 1902 and emphasized, the user 1402 may more easily identify the corresponding components on the real-world equipment 1406. In some embodiments, the digital twin 1512 may update based on the live image 1902 of the real-world equipment. For example, a particular hydraulic hose may have been installed such that it hangs in a slightly different position than the corresponding hose was modeled in the digital twin CAD model. The application 1414 may detect the position of the real-world hose based on its being in a similar position to the digital twin hose and may update the digital twin such that the digital twin hose is more accurately overlaid on the real-world hose. Thus, when the digital twin hose is displayed and emphasized, it will more closely overlap with the live image of the real-world hose. In some embodiments, the application 1414 may be configured to detect that a component of the real-world equipment 1406 is significantly out of position, indicating that it may have been installed incorrectly or has moved out of position. In response to detecting that a component is out of position, the application 1414 may display an alert on the GUI 1506 indicating that the component needs attention, and may provide instructions for reinstalling the component. These features are discussed below in reference to FIG. 21.

Figure 21:
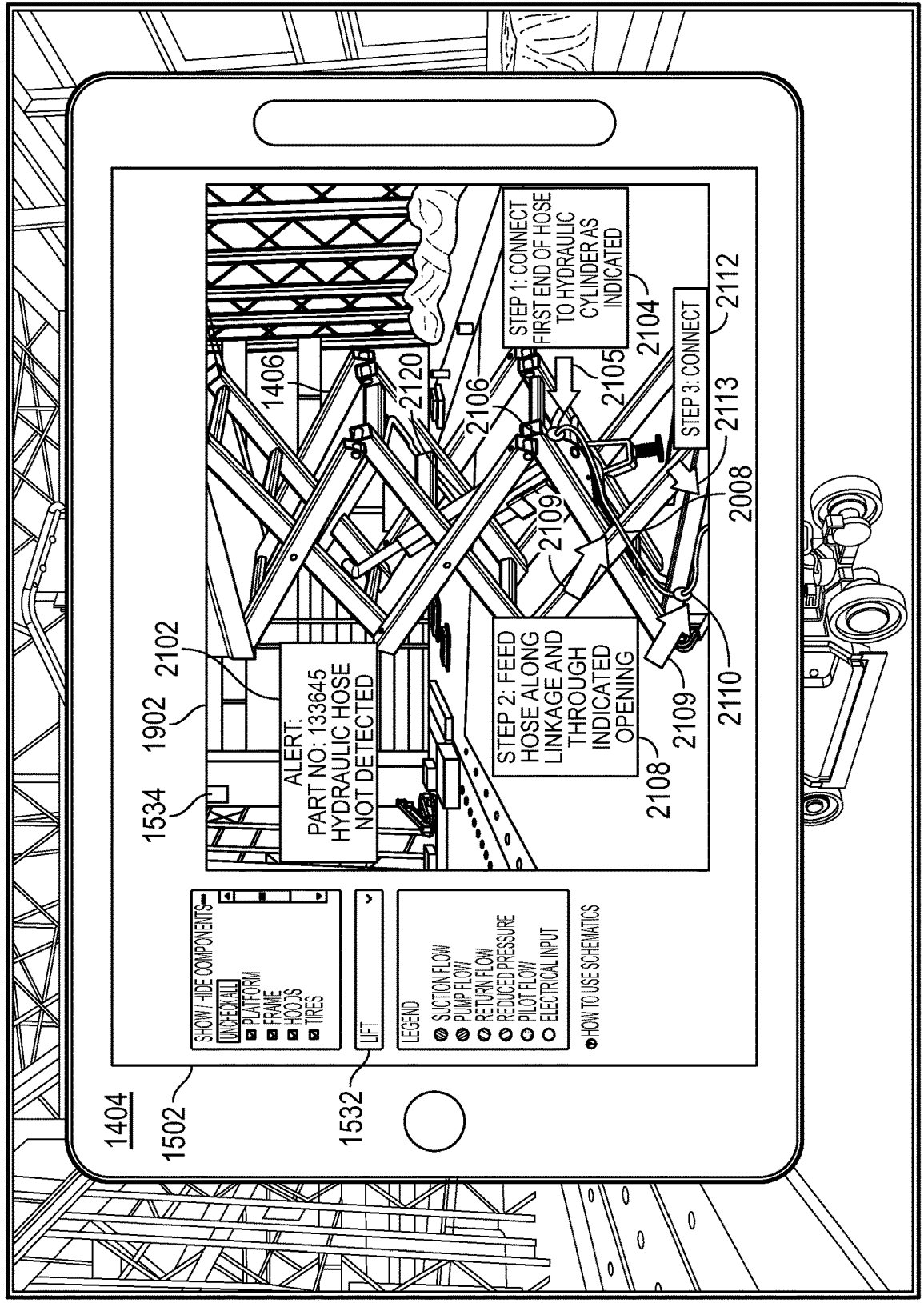

Referring now to FIG. 21, the user device 1404 is shown during operation of the application 1414, according to an example embodiment. The defect detection module 1568 may detect a defect in the equipment 1406 and may display an alert on the GUI 1506 indicating that the defect has been detected. Defects may include that a component of the equipment 1406 has been installed incorrectly, is missing, or is otherwise out of place. The application 1414 may detect that a component is out of place if the component does not align with the corresponding component of the digital twin 1512 within a specified margin of error. In some embodiments, if a component of the equipment 1406 does not perfectly align with the corresponding component of the digital twin 1512, but is within a predefined margin of error, the application may adjust the digital twin 1512 such that the components are aligned. However, if the position of the real-world component falls outside the margin of error, the application 1414 may detect a defect and may display an alert that the component is out of place or missing. The application 1414 may further display instructions for fixing the defect and/or replacing the component.

In the example shown in FIG. 21, the application has detected that hydraulic hose 1918 is missing. The application displays an alert 2102 indicating that the hydraulic hose 1918 is missing. The application also displays instructions 2104, 2108, 2112 for installing a replacement hydraulic hose 1918. The first instruction 2104 instructs the user 1402 to connect the first end of hydraulic hose 1918 to the hydraulic cylinder 2120. The first instruction 2104 may have an associated arrow 2105 directing the user to the location that the hose 1918 is to be connected. An indicator 2106 may highlight where the hydraulic hose 1918 should be attached to the hydraulic cylinder 2120. The second instruction 2108 instructs the user 1402 to feed the hydraulic hose 1918 along one of the lift linkages, through an opening in the lift base to the main valve assembly in the base. The second instruction 2108 may have one or more associated arrows 2109 directing the user to the location that the hose 1918 is to be connected. An indicator 2110 may highlight the opening in the base where the hydraulic hose 1918 should be fed through. The third instruction 2112 instructs the user 1402 to connect the hydraulic hose 1918 to the main valve assembly in the base of the lift. The remainder of the instruction 2112 may be displayed if the user 1402 pans the camera down towards the base. The first instruction 2104 may have an associated arrow 2105 directing the user to the location that the hose 1918 is to be connected. In some embodiments, one instruction may be displayed at a time, and the user may confirm that the instruction has been completed before the next instruction is shown.

Figure 22:
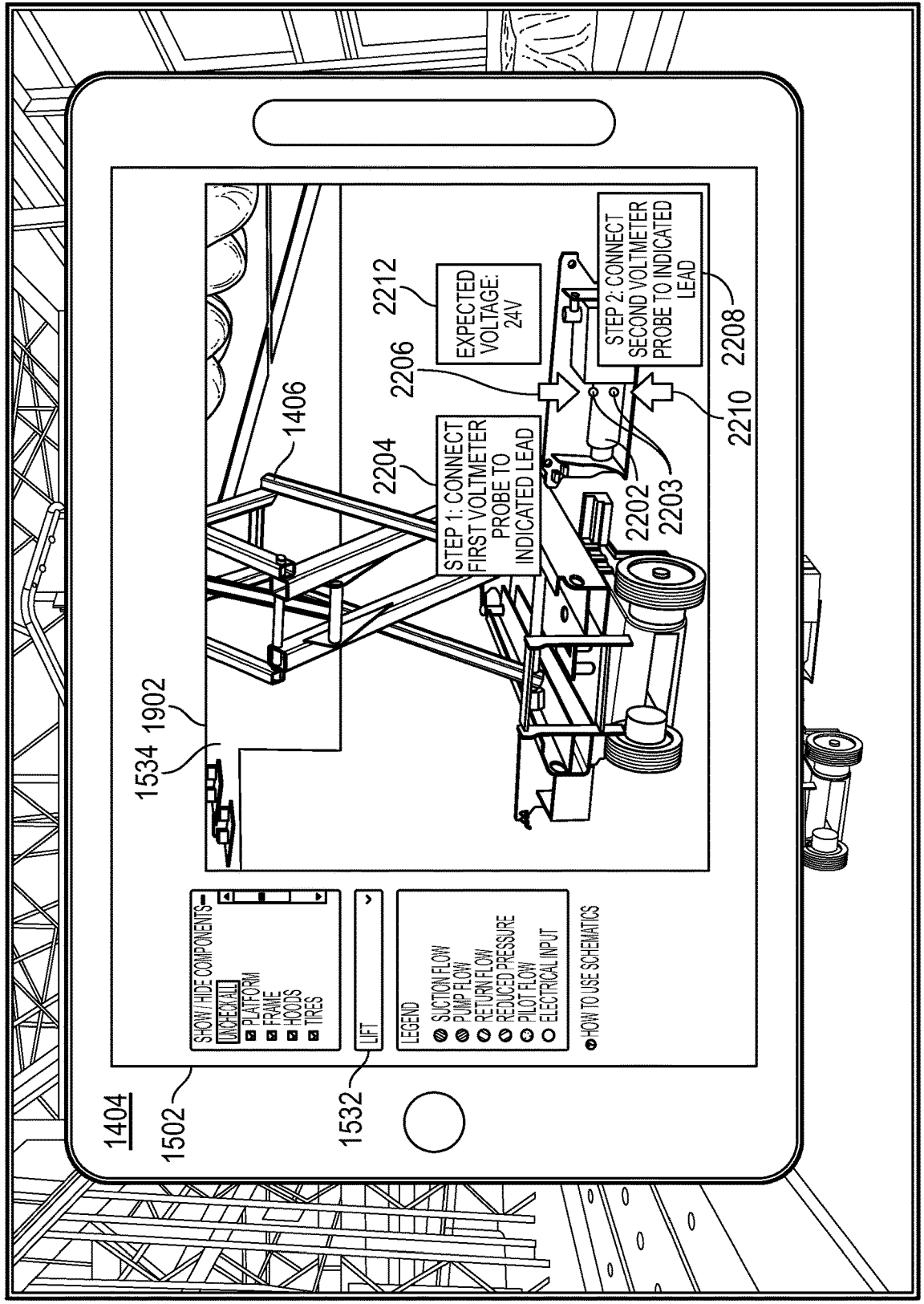

Referring now to FIG. 22, the user device 1404 is shown during operation of the application 1414, according to an example embodiment. The manual inspection module 1566 may allow the user 1402 performing an inspection of the equipment 1406 to select an inspect-able feature from a list of inspect-able features. In other embodiments, the user may select a component of the equipment via the GUI 1506 and the application 1414 may display one or more inspect-able features of the selected component for the user 1402 to choose from. Once an inspect-able feature is selected, the application may display instructions for inspecting the selected feature. In the example shown in FIG. 22, the user 1402 has selected the hydraulic pump 2202 from the list of inspect-able features. The application 1414 displays instructions 2204, 2208 on the GUI 1506 for measuring the voltage across the pump 2202 with a voltmeter. Here, the instructions 2204, 2208 instruct the user 1402 to connect the probes of the voltmeter to the leads of the pump 2202. The instructions 2204, 2208 may be coupled with arrows 2206, 2210 pointing the user to the leads. The application 1414 displays and emphasizes the leads 2203 of the corresponding hydraulic pump in the digital twin 1512 so that the user knows where to place the probes of the voltmeter. The application may display an expected reading 2212 or an expected range of readings that should be measured by the voltmeter. The user 1402 follows the instructions to measure the voltage across the pump and compares the reading to the expected reading 2212. If the reading differs from the expected reading 2212, this may indicate a problem with the pump 2202.

Figure 23:
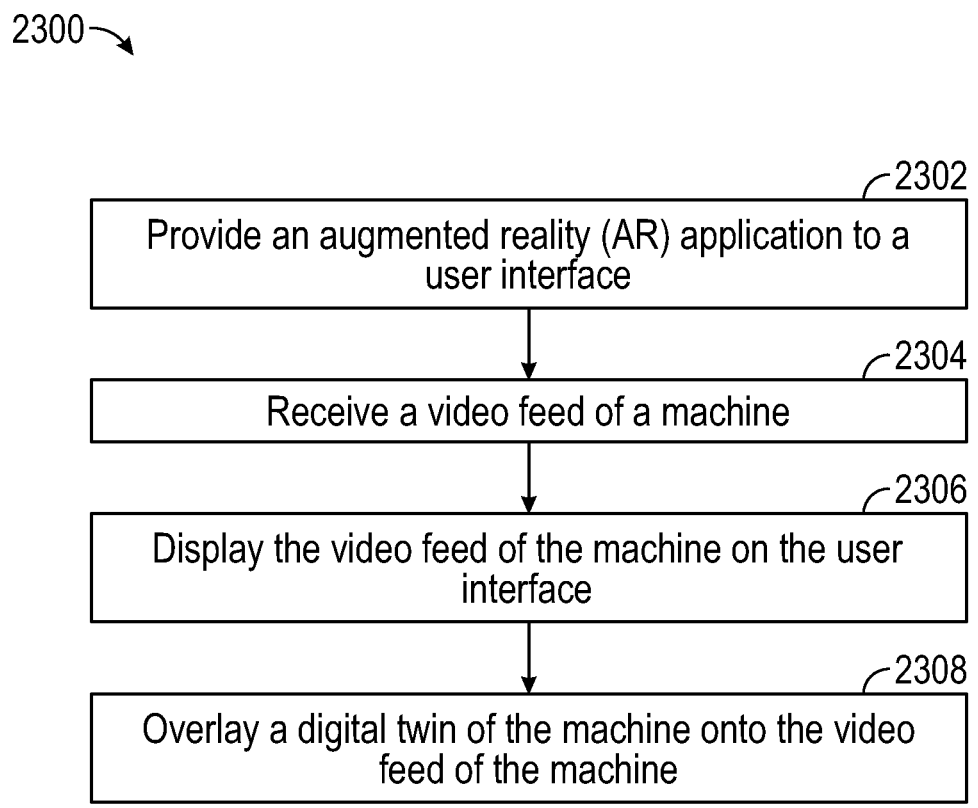
FIG. 23 is a flow diagram of a process for overlaying a digital twin on a video feed of a machine, which may be performed by the application as shown in FIGS. 16-22, according to some embodiments.

FIG. 23 illustrates a process 2300 for inspecting a machine using AR, in accordance with some embodiments. The process 2300 may be performed, for example, on a user device 1404 or a server 1412. At operation 2302, the process 2300 includes providing an augmented reality application 1414 to a user interface. The application 1414 may be displayed on a screen 1502 of the user device 1404 (tablet, laptop, head-mounted device, etc.). At operation 2304, a video feed of a machine to be inspected is received. The video feed may be from an embedded camera of the user device 1404 or another camera. At operation 2306, the video feed of the machine is displayed on the user interface. At operation 2308, a digital twin 1512 is overlaid onto the video feed of the machine on the user interface. The digital twin 1512 may be visible on the user interface, may be partially transparent, or may be invisible. In some embodiments, certain components of the digital twin 1512 may be visible while others are invisible. The digital twin comprises a sensor reading from each of one or more sensors embedded in the machine.

Figure 24:
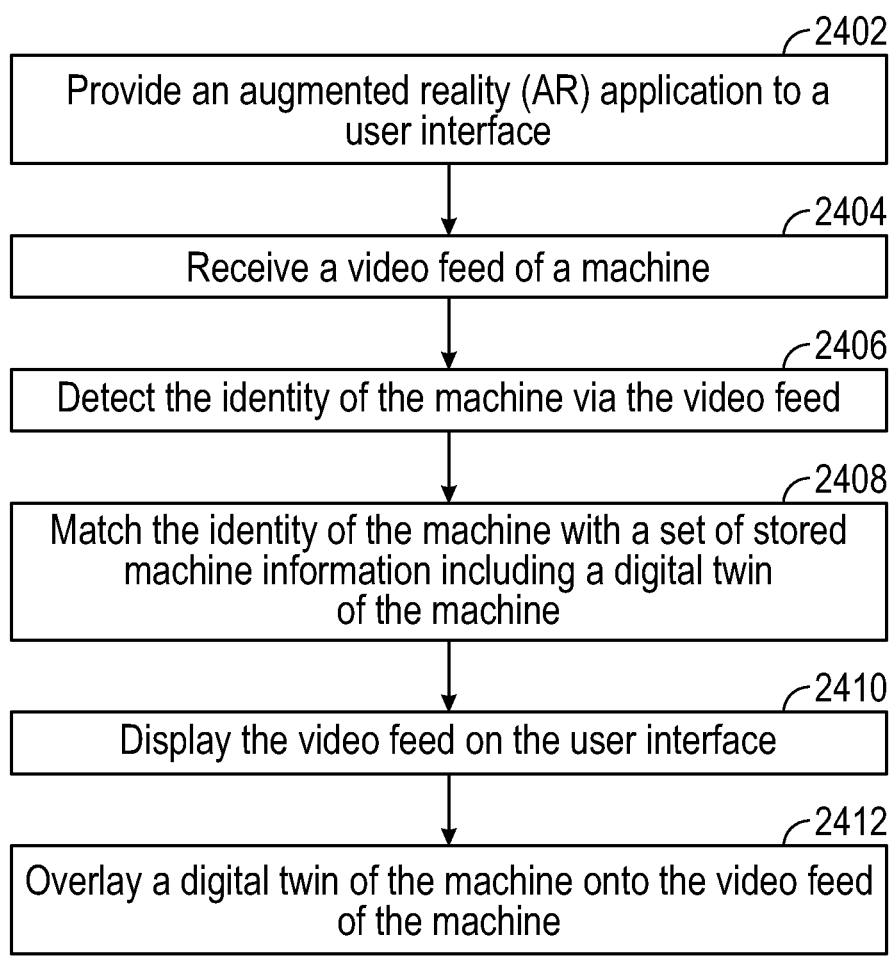
FIG. 24 is a flow diagram of a process for detecting the identity of a machine and matching the machine with a set of stored machine information, which may be performed by the application as shown in FIGS. 16-23, according to some embodiments.

FIG. 24 illustrates a process 2400 for inspecting a machine using AR, in accordance with some embodiments. At operation 2402, the process 2400 includes providing an augmented reality application 114 to a user interface. At operation 2404, a video feed of a machine to be inspected is received. At operation 2406, the identity of the machine is detected via the video feed. For example, the machine may be identified based on detecting the shape of the machine, based on detecting a decal affixed to the machine, based on detecting a QR code affixed to the machine, or based on detecting a barcode affixed to the machine. At operation 2408, the identity of the machine may be matched with a set of stored machine information associated with the machine. The stored set of machine information may be stored in a database 1410 with other sets of machine information associated with other machines. The set of stored machine information includes a digital twin of the machine. At operation 2410, the video feed of the machine is displayed on the user interface. At operation 2412, a digital twin 1512 is overlaid onto the video feed of the machine on the user interface. The digital twin comprises a sensor reading from each of one or more sensors embedded in the machine.

Figure 25:
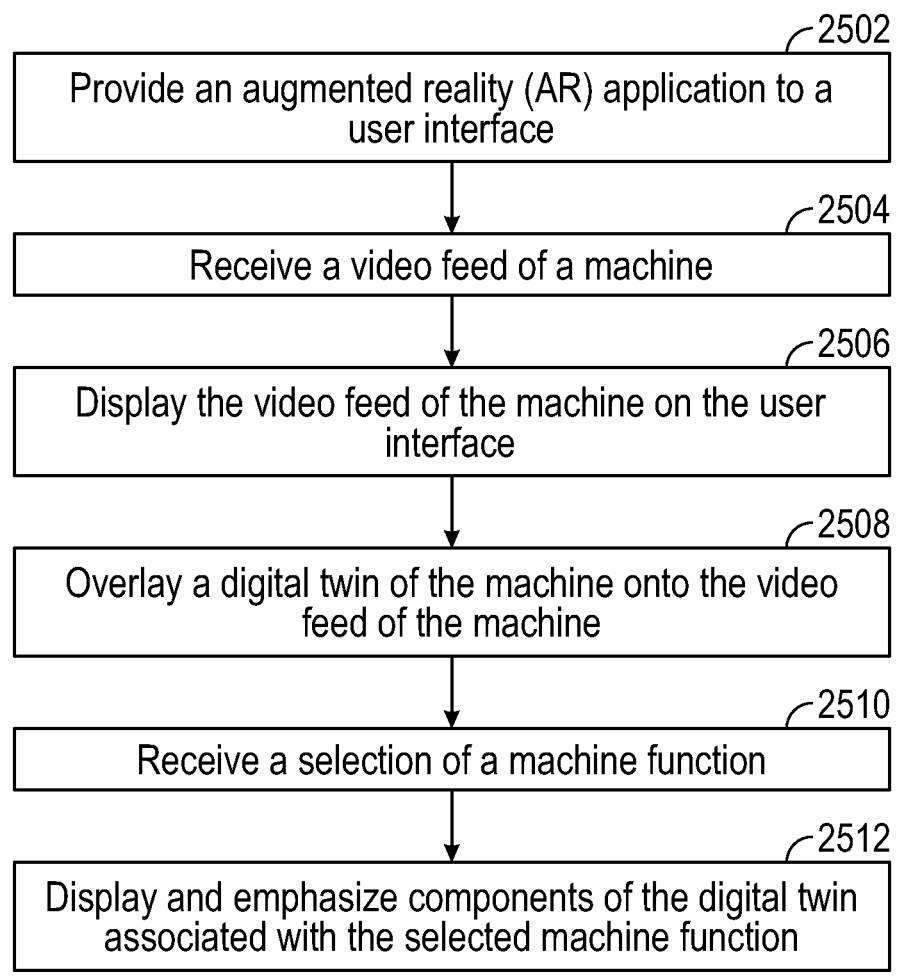
FIG. 25 is a flow diagram of a process for augmented reality-assisted troubleshooting of a machine based on a selected function, which may be performed by the application as shown in FIGS. 16-23, according to some embodiments.

FIG. 25 illustrates a process 2500 for inspecting a machine using AR, in accordance with some embodiments. At operation 2502, the process 2500 includes providing an augmented reality application 1414 to a user interface. At operation 2504, a video feed of a machine to be inspected is received. At operation 2506, the video feed of the machine is displayed on the user interface. At operation 2508, a digital twin 1512 is overlaid onto the video feed of the machine on the user interface. The digital twin comprises a sensor reading from each of one or more sensors embedded in the machine. At operation 2510, a selection of a machine function is received. The selection may include a selection of a sub-function. Functions may include, for example, driving the machine, turning the machine, lifting a portion of the machine, extending a portion of the machine, etc. Sub-functions may include, for example, driving forwards, driving backwards, turning left, turning right, etc. At operation 2512, components of the digital twin associated with the selected function are displayed an emphasized. Emphasizing the components may include, for example, changing the color of the components, brightening the components, enlarging the components, etc. FIG. 20 illustrates a user device 1404 displaying a GUI 1506 in accordance with process 2500.

Figure 26:
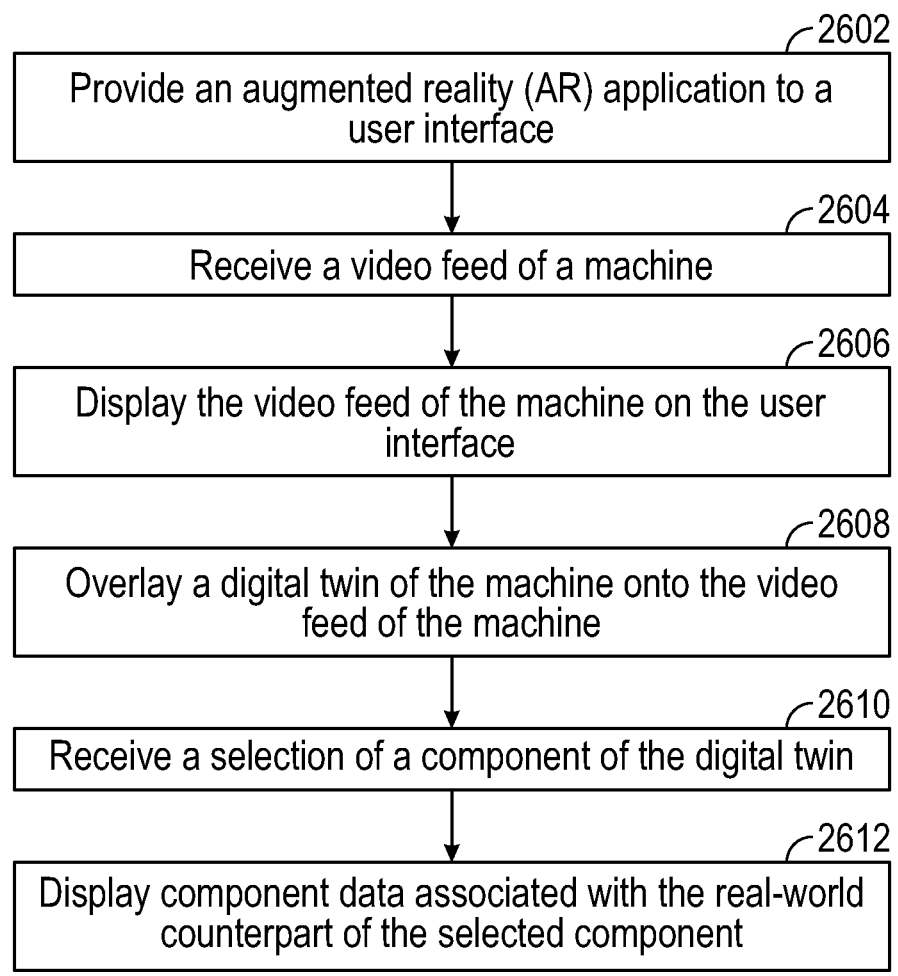
FIG. 26 is a flow diagram of a process for displaying component data for a selected machine component, which may be performed by the application as shown in FIGS. 16-23, according to some embodiments.

FIG. 26 illustrates a process 2600 for inspecting a machine using AR, in accordance with some embodiments. At operation 2602, the process 2600 includes providing an augmented reality application 1414 to a user interface. At operation 2604, a video feed of a machine to be inspected is received. At operation 2606, the video feed of the machine is displayed on the user interface. At operation 2608, a digital twin 1512 is overlaid onto the video feed of the machine on the user interface. The digital twin 1512 comprises a sensor reading from each of one or more sensors embedded in the machine. At operation 2610, a selection of a component of the digital twin 1512 is received. A component may be selected for example, by clicking the component with a mouse cursor or touching the component on a touchscreen 1504. At operation 2612, component data associated with the real-world counterpart of the selected component may be displayed on the user interface. The component data may include, for example, sensor measurements associated with the real-world counterpart, an expected sensor range associated with those sensor measurements, an expected service life of the selected component, or the service age of the selected component. An alert may be displayed on the user interface if the sensor measurement falls outside the expected sensor range or if the service age exceeds the expected service life. FIGS. 18 and 19 illustrate a user device displaying a GUI 1506 in accordance with process 2600.

Figure 27:
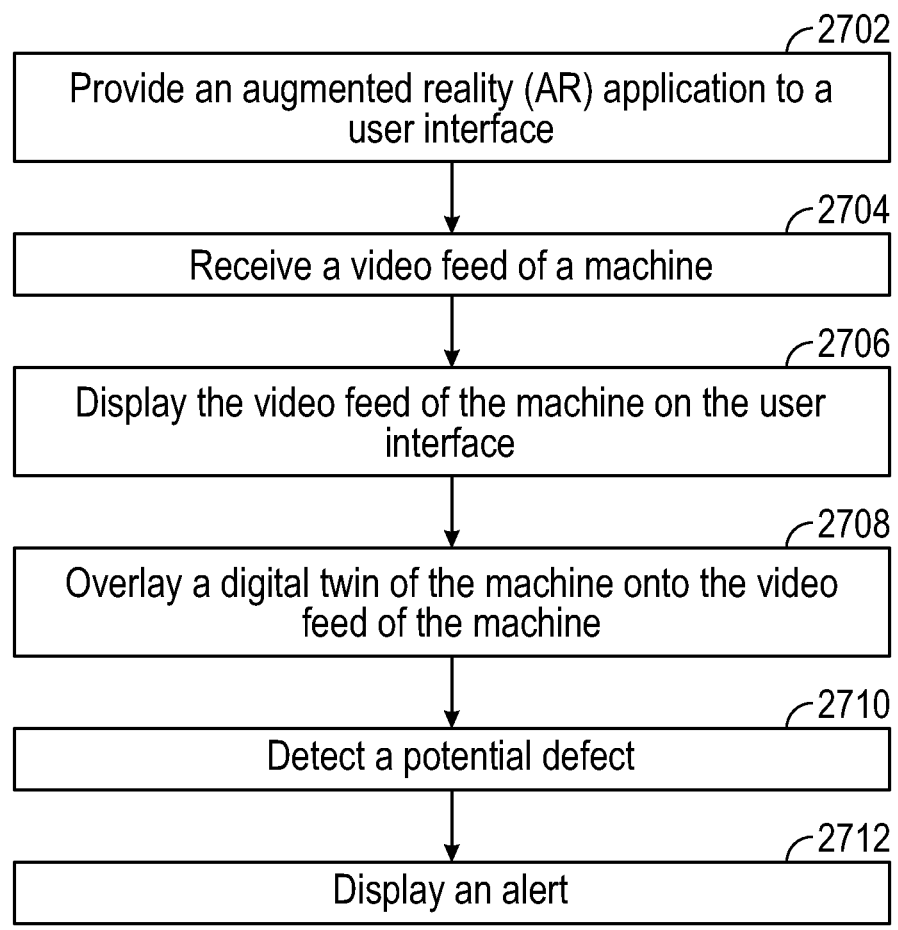
FIG. 27 is a flow diagram of a process for detecting a machine defect and displaying an alert, which may be performed by the application as shown in FIGS. 16-23, according to some embodiments.
Figure 28:
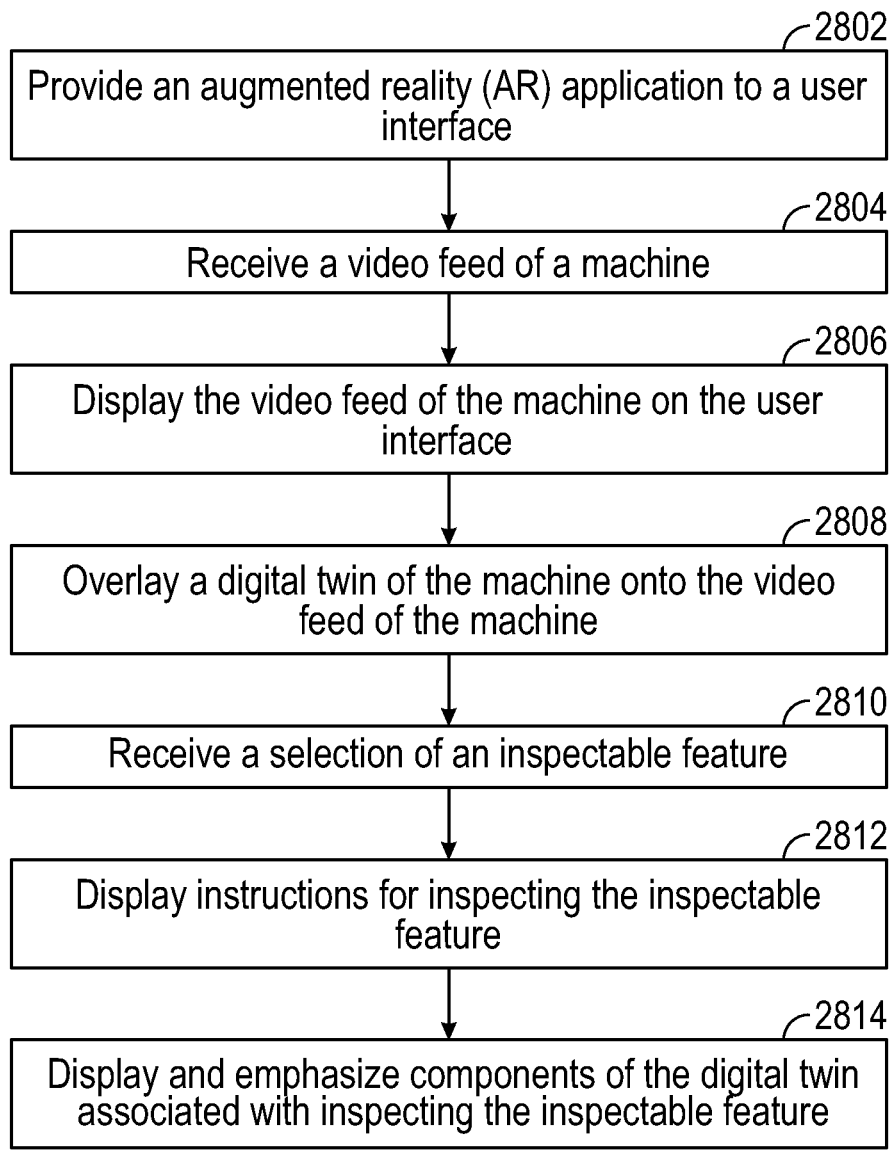
FIG. 28 is a flow diagram of a process for assisting the manual inspection of a machine, which may be performed by the application as shown in FIGS. 16-23, according to some embodiments.

FIG. 27 illustrates a process 2700 for inspecting a machine using AR, in accordance with some embodiments. At operation 2702, the process 2700 includes providing an augmented reality application 2714 to a user interface. At operation 2704, a video feed of a machine to be inspected is received. At operation 2706, the video feed of the machine is displayed on the user interface. At operation 2708, a digital twin 1512 is overlaid onto the video feed of the machine on the user interface. The digital twin 1512 comprises a sensor reading from each of one or more sensors embedded in the machine. At operation 2710, a potential defect is detected. For example, a component of the machine may be detected to be missing or out of place because the component of the machine does not align with the corresponding component of the digital twin. This may indicate that the component of the machine was installed incorrectly or has shifted out of position. At operation 2712, an alert may be displayed on the user interface. The alert may include displaying and emphasizing the component of the digital twin that is detected to be missing or out of place. The alert may include instructions for reinstalling the component. FIG. 21 illustrates a user device displaying a GUI 1506 in accordance with process 2700.

FIG. 15 illustrates a process 1500 for inspecting a machine using AR, in accordance with some embodiments. At operation 1502, the process 1500 includes providing an augmented reality application 1414 to a user interface. At operation 2804, a video feed of a machine to be inspected is received. At operation 2806, the video feed of the machine is displayed on the user interface. At operation 2808, a digital twin 1512 is overlaid onto the video feed of the machine on the user interface. The digital twin 1512 comprises a sensor reading from each of one or more sensors embedded in the machine. At operation 2810, a selection of an inspect-able feature is received. For example, an inspect-able feature may include an electrical component, such as a motor, that can be inspected with a voltmeter. At operation 2812, instructions for inspecting the inspect-able feature are displayed on the user interface. The instructions may be text-based and/or graphical. For example, the instructions may include arrows pointing to the components of the machine to be inspected. At operation 2814 the components of the digital twin 1512 associates with inspecting the inspect-able feature of the machine are displayed and emphasized. For example, if the inspect-able feature is an electric motor, the terminals of the electric motor of the digital twin 1512 may be displayed and emphasized. The instructions may include text based instructions to touch the two probes of a voltmeter to the terminals of the motor. The instructions may include arrows pointing to the motor so that the user can more easily locate the selected motor. The terminals of the motor in the digital twin 1512 can be displayed and emphasized so that the user 102 knows where to touch the probes of the voltmeter. FIG. 22 illustrates a user device displaying a GUI 1506 in accordance with process 2800.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the applications (e.g., application 114) as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method for troubleshooting a piece of equipment, the method comprising:
    providing an equipment troubleshooting graphical user interface (GUI) to a user device;
    receiving, from the user device, an input indicating an identity of a piece of equipment;
    providing, via the GUI, a 3D model of the identified piece of equipment, the 3D model comprising a plurality of components;
    receiving, from the user device, an input identifying a function of the piece of equipment from a first list of functions;
    updating the GUI to emphasize components of the 3D model corresponding to the identified function from the first list of functions;
    receiving, from the user device, a first selection of a 2D schematic button;
    updating, in response to receiving the first selection of the 2D schematic button, the GUI to display a 2D schematic of the piece of equipment and provide a second list of functions;
    receiving, from the user device, a second selection of a function from the second list of functions; and
    emphasizing, in response to receiving the second selection, at least one portion of the 2D schematic corresponding to the function from the second selection.

2. The method of claim 1, further comprising providing, via the GUI, a list of equipment from a database of available 3D models.

3. The method of claim 1, wherein emphasizing a component of the 3D model comprises one or more of brightening the component, changing a color of the component, enlarging the component, or causing the component to change from a hidden state to a visible state.

4. The method of claim 1, further comprising:
    receiving, from the user device, a selection of a component of the 3D model; and
    providing, via the GUI, additional information about the selected component.

5. The method of claim 1, further comprising:
    receiving, from the user device, a selection of a component of the 3D model;
    providing, via the GUI, a link to add the selected component to a digital shopping cart in response to receiving the selection of the component;
    receiving, from the user device, a selection of the link; and
    adding, in response to receiving the selection of the link, the selected component to the digital shopping cart.

6. The method of claim 1, further comprising:
    receiving, from the user device, a command to hide a set of one or more components of the 3D model; and
    updating, in response to the command, the GUI such that the set of one or more components are not visible.

7. The method of claim 1, wherein providing the GUI further comprises providing a legend for identifying components of the 3D model by category.

8. The method of claim 1, further comprising:
    receiving, from the user device, a manipulation command, the manipulation command comprising one of a rotation command, a pan command, and a zoom command; and
    updating, in response to the command, the orientation, position, or size of the 3D model in the GUI,
    wherein the orientation is updated in response to the rotation command, the position is updated in response to the pan command, and the size is updated in response to the zoom command.

9. A system for troubleshooting a piece of equipment, the system comprising:
    a user device configured to display a GUI; and
    a server comprising a processing circuit comprising one or more processors and memory storing instructions that, when executed by the one or more processors, cause the one or more processors to perform operations comprising:
  providing an equipment troubleshooting GUI to the user device;
  receiving, from the user device, an input indicating an identity of a piece of equipment;
  providing, via the GUI, a 3D model of the identified piece of equipment, the 3D model comprising a plurality of components;
  receiving, from the user device, an input identifying a first function of the piece of equipment;
  updating the GUI to emphasize a first component of the 3D model corresponding to the first function without emphasizing a second component of the 3D model corresponding to a second function of the piece of equipment;
  receiving, from the user device, a first selection of a 2D schematic button;
  updating, in response to receiving the first selection of the 2D schematic button, the GUI to display a 2D schematic of the piece of equipment and provide a list of functions;
  receiving, from the user device, a second selection of a function from the list of functions; and
  emphasizing, in response to receiving the second selection, at least one portion of the 2D schematic corresponding to the function from the second selection.

10. The system of claim 9, wherein the processing circuit is further configured to: receive, from the user device, a selection of a component of the 3D model; and
  provide, via the GUI, additional information about the selected component.

11. The system of claim 9, wherein the processing circuit is further configured to: receive, from the user device, a selection of a component of the 3D model;
  provide, via the GUI, a link to add the selected component to a digital shopping cart in response to receiving the selection of the component;
  receive, from the user device, a selection of the link; and
  add, in response to receiving the selection of the link, the selected component to the digital shopping cart.

12. The system of claim 9, wherein the processing circuit is further configured to:
  receive, from the user device, a command to hide a set of one or more components of the 3D model; and
  update, in response to the command, the GUI such that the set of one or more components are not visible.

13. The system of claim 9, wherein the processing circuit is further configured to:
  receive, from the user device, a manipulation command, the manipulation command comprising one of a rotation command, a pan command, and a zoom command; and
  update, in response to the command, the orientation, position, or size of the 3D model in the GUI, wherein the orientation is updated in response to the rotation command, the position is updated in response to the pan command, and the size is updated in response to the zoom command.

14. An equipment troubleshooting tool for providing three-dimensional models of selected equipment, the tool comprising a non-transitory computer-readable medium having instructions stored thereon that, when executed by one or more processors, cause the one or more processors to implement operations comprising:
  providing a GUI to a user device;
  receiving, from the user device, an input indicating an identity of a piece of equipment;
  providing, via the GUI, a model of the identified piece of equipment, the model comprising a plurality of components;
  receiving, from the user device, an input identifying a function of the piece of equipment, the function including at least one of lifting a portion of the piece of equipment, steering the piece of equipment, or driving the piece of equipment;
  updating the GUI to emphasize components of the 3D model associated with the function;
  receiving, from the user device, a first selection of a 2D schematic button;
  updating, in response to receiving the first selection of the 2D schematic button, the GUI to display a 2D schematic of the piece of equipment and provide a list of functions;
  receiving, from the user device, a second selection of a function from the list of functions; and
  emphasizing, in response to receiving the second selection, at least one portion of the 2D schematic corresponding to the function from the second selection.

15. The equipment troubleshooting tool of claim 14, wherein the operations further comprise: receiving, from the user device, a selection of a component of the model;
  providing, via the GUI, a link to add a replacement component for the selected component to a digital shopping cart in response to receiving the selection of the component;
  receiving, from the user device, a selection of the link; and
  adding, in response to receiving the selection of the link, the selected component to the digital shopping cart.

16. The equipment troubleshooting tool of claim 14, wherein receiving the input indicating the identity of the piece of equipment comprises receiving a photograph or video feed and detecting, in the photograph or video feed, at least one of a text based decal, a barcode, a QR code, or the shape of the equipment.

17. The equipment troubleshooting tool of claim 14, wherein updating the GUI to emphasize the components of the 3D model associated with the function comprises causing hidden components or invisible components to become visible.

18. The equipment troubleshooting tool of claim 14, wherein the piece of equipment includes at least one of a scissor lift, a boom lift, or a telehandler.

* * * * *